United States Patent
Motoyama et al.

(10) Patent No.: US 9,760,182 B2
(45) Date of Patent: Sep. 12, 2017

(54) INPUT APPARATUS, DEVICE CONTROL METHOD, RECORDING MEDIUM, AND MOBILE APPARATUS

(71) Applicant: Panasonic Intellectual Property Management Co., Ltd., Osaka (JP)

(72) Inventors: Hiroyuki Motoyama, Osaka (JP); Tsuyoshi Inoue, Nara (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 14/801,472

(22) Filed: Jul. 16, 2015

(65) Prior Publication Data

US 2016/0041620 A1    Feb. 11, 2016

(30) Foreign Application Priority Data

Aug. 8, 2014  (JP) ................. 2014-162803
Apr. 1, 2015  (JP) ................. 2015-075424

(51) Int. Cl.
*G06F 3/01* (2006.01)
*G06F 1/16* (2006.01)
(Continued)

(52) U.S. Cl.
CPC .............. *G06F 3/017* (2013.01); *G06F 1/163* (2013.01); *G06F 3/012* (2013.01); *G06F 3/015* (2013.01);
(Continued)

(58) Field of Classification Search
CPC ........ G06F 3/017; G06F 1/163; G06F 3/0346; G06F 3/014; G06F 3/04883; G06F 1/1694
See application file for complete search history.

(56) References Cited

U.S. PATENT DOCUMENTS

| 5,946,274 A | 8/1999 | Yamaguchi et al. |
| 8,896,526 B1 * | 11/2014 | Park ................. G04C 3/002 345/156 |
| 2010/0124949 A1 * | 5/2010 | Demuynck ........... G06F 1/1626 455/569.1 |

(Continued)

FOREIGN PATENT DOCUMENTS

| JP | 2-069693 | 3/1990 |
| JP | 10-170671 | 6/1998 |

OTHER PUBLICATIONS

Xu et al., Hand Gesture Recognition and Virtual Game Control Based on 3 Accelerometer and EMG Sensors, 2009, ACM.*

*Primary Examiner* — Koosha Sharifi-Tafreshi
(74) *Attorney, Agent, or Firm* — Wenderoth, Lind & Ponack, L.L.P.

(57) ABSTRACT

An input apparatus for controlling an information terminal includes a gesture detecting unit that detects a rotational movement of a wrist of a user about a lower arm of the user and an output unit that outputs a control command for controlling a device to be controlled to the device to be controlled on the basis of a rotational direction of the detected rotational movement. If the gesture detecting unit detects a first rotational movement in a first rotational direction and thereafter detects a second rotational movement in a second rotational direction that is opposite to the first rotational direction, the output unit outputs a second control command corresponding to the second rotational direction without outputting a first control command corresponding to the first rotational direction.

18 Claims, 32 Drawing Sheets

(51) Int. Cl.
*G06F 3/0482* (2013.01)
*G08C 17/00* (2006.01)
*H04N 5/44* (2011.01)
*G06F 3/0346* (2013.01)

(52) U.S. Cl.
CPC .......... *G06F 3/0346* (2013.01); *G06F 3/0482* (2013.01); *G08C 17/00* (2013.01); *H04N 5/4403* (2013.01); *G06F 2200/1637* (2013.01); *G08C 2201/32* (2013.01); *H04N 2005/4428* (2013.01)

(56) References Cited

U.S. PATENT DOCUMENTS

| | | | |
|---|---|---|---|
| 2012/0221177 A1* | 8/2012 | Shin ................. | B25J 13/02 701/2 |
| 2015/0084860 A1* | 3/2015 | Aleem ............... | G06F 3/017 345/156 |
| 2015/0085621 A1* | 3/2015 | Hong ................ | G04G 21/00 368/10 |
| 2016/0124500 A1* | 5/2016 | Lee .................. | G08C 17/00 345/156 |

* cited by examiner

FIG. 6

| DATE AND TIME OF MEASUREMENT | Ch1−CH_ref | Ch2−CH_ref | Ch3−CH_ref | Ch4−CH_ref | x_acc | y_acc | z_acc |
|---|---|---|---|---|---|---|---|
| 2/5/2014 19:00:10:005 | −1.811 | 11.029 | −33.485 | −31.086 | −0.04829 | −0.94422 | −0.34524 |
| 2/5/2014 19:00:10:006 | −9.284 | 2.282 | −27.706 | −28.549 | −0.02616 | −0.92629 | −0.35516 |
| 2/5/2014 19:00:10:007 | −4.145 | 0.307 | −15.968 | −17.017 | −0.05634 | −0.92629 | −0.32143 |
| 2/5/2014 19:00:10:008 | 14.319 | 6.866 | 0.161 | 2.687 | −0.05433 | −0.95418 | −0.35516 |
| 2/5/2014 19:00:10:009 | 34.121 | 15.559 | 15.501 | 22.689 | −0.04024 | −0.93227 | −0.35913 |
| 2/5/2014 19:00:10:010 | 39.039 | 16.868 | 23.268 | 31.848 | 0.07445 | −0.91434 | −0.34921 |
| 2/5/2014 19:00:10:011 | 23.202 | 7.105 | 19.98 | 24.433 | −0.05231 | −0.96215 | −0.35714 |
| 2/5/2014 19:00:10:012 | −2.73 | −7.7 | 8.673 | 5.714 | −0.05835 | −0.92032 | −0.34127 |
| 2/5/2014 19:00:10:013 | −20.684 | −17.114 | −3.016 | −11.596 | −0.0664 | −0.93625 | −0.32341 |
| 2/5/2014 19:00:10:014 | −20.803 | −15.542 | −8.358 | −17.289 | −0.05835 | −0.92829 | −0.34921 |
| 2/5/2014 19:00:10:015 | −8.539 | −6.495 | −6.033 | −11.181 | −0.04628 | −0.93426 | −0.3631 |
| 2/5/2014 19:00:10:016 | 2.391 | 1.564 | −0.341 | −1.959 | −0.06036 | −0.92032 | −0.36508 |
| 2/5/2014 19:00:10:017 | 3.198 | 3.153 | 2.773 | 1.152 | −0.06237 | −0.92829 | −0.33333 |
| ... | ... | ... | ... | ... | ... | ... | ... |

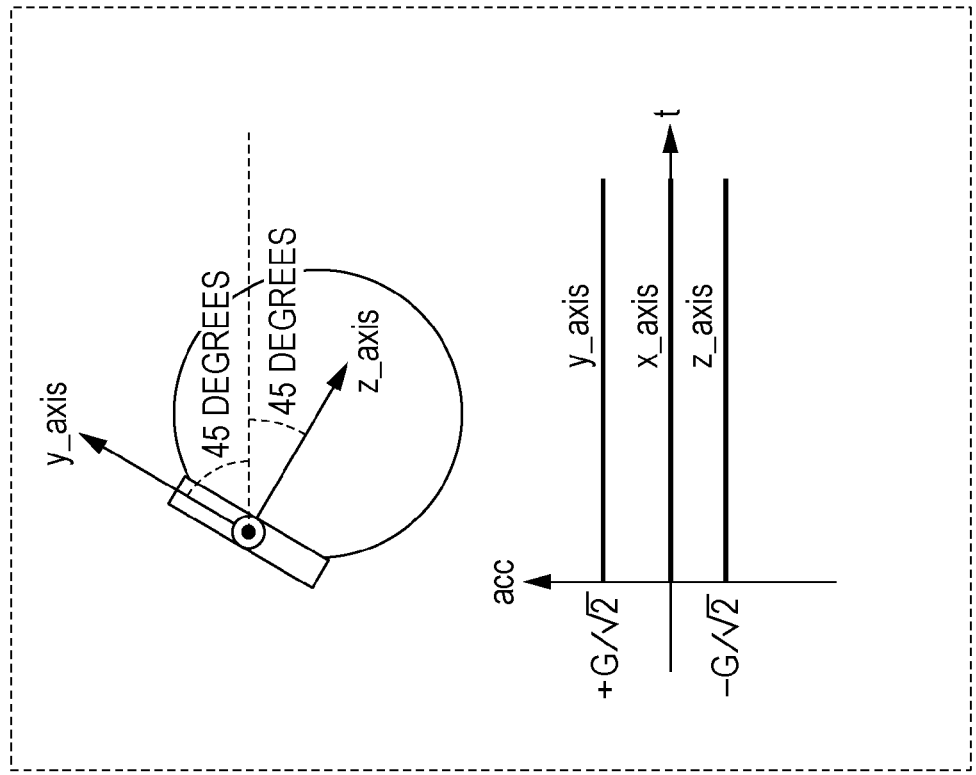
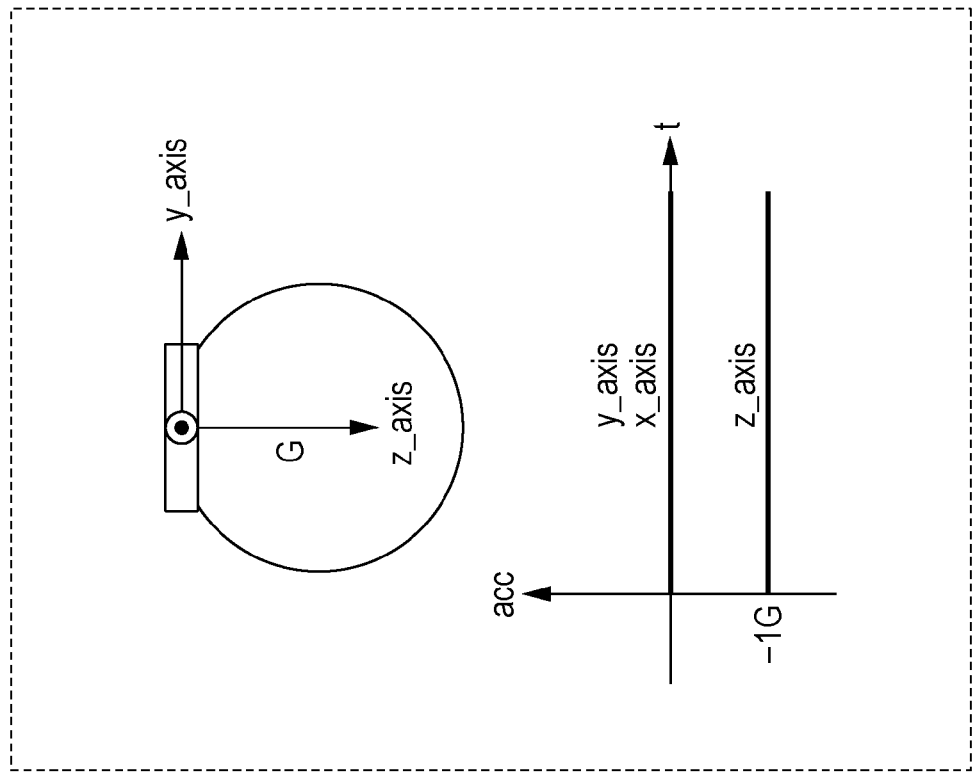

FIG. 11

| WRIST POSITION 1601 | ROTATION ANGLE ABOUT x-AXIS [deg] 1602 | ROTATION ANGLE ABOUT y-AXIS [deg] 1603 | ROTATION ANGLE ABOUT z-AXIS [deg] 1604 |
|---|---|---|---|
| WRIST POSITION 1 | −10<x_axis<40 | −50<y_axis<50 | −10<z_axis<30 |
| WRIST POSITION 2 | −20<x_axis<40 | −150<y_axis<−120 | −10<z_axis<30 |
| WRIST POSITION 3 | −30<x_axis<30 | −50<y_axis<50 | −40<z_axis<40 |
| ... | ... | ... | ... |

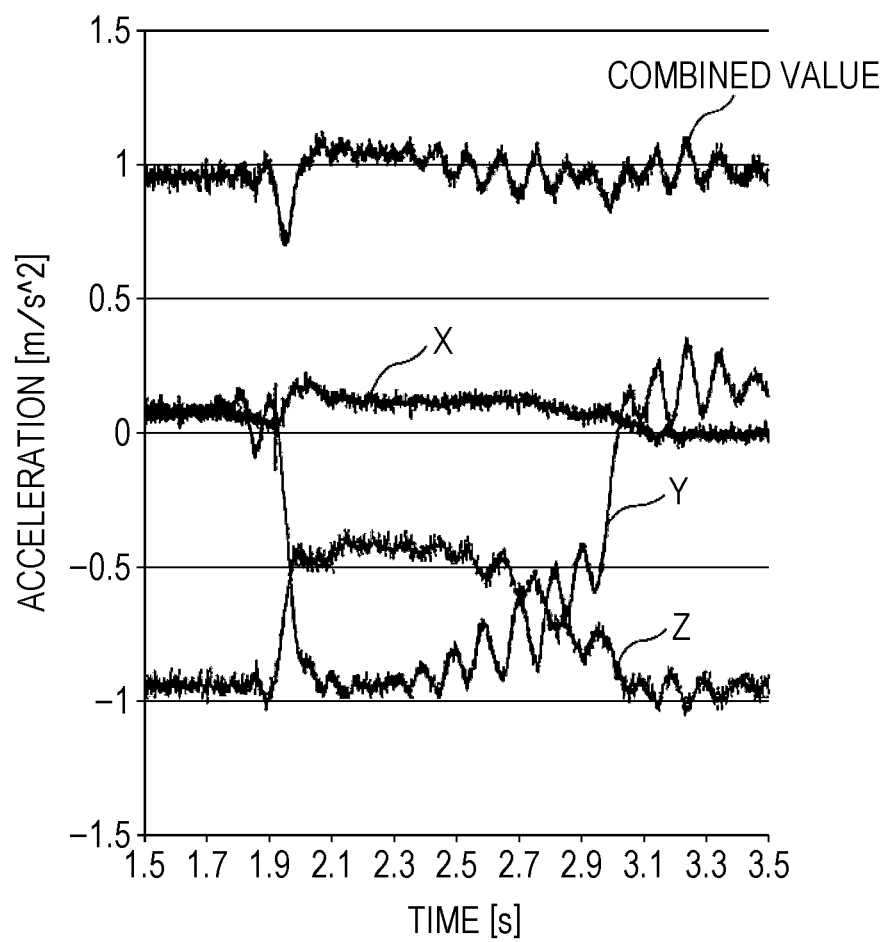

FIG. 26

| ANGLE | −90 DEGREES | −45 DEGREES | 0 DEGREE | 30 DEGREES | 90 DEGREES |
|---|---|---|---|---|---|
| STATE | | | | | |
| x_axis | 0 | 0 | 0 | 0 | 0 |
| y_axis | −G | −G/√2 | 0 | +G/2 | +G |
| z_axis | 0 | −G/√2 | −G | −√3G/2 | 0 |

FIG. 27

| x_axis | y_axis | z_axis |
|---|---|---|
| 0 | $-G \leq y\_axis \leq +G/2$ | $-G \leq z\_axis \leq 0$ |

INPUT APPARATUS, DEVICE CONTROL METHOD, RECORDING MEDIUM, AND MOBILE APPARATUS

BACKGROUND

1. Technical Field

The present disclosure relates to an input apparatus, a device control method, a storage medium, and a mobile apparatus for controlling a device to be controlled using gestures of a user.

2. Description of the Related Art

To operate a multi-function watch, a technique using mechanical switches and a touch panel has been developed. In such an operating technique, the switches and touch panel need to be operated by an arm (hand) that is opposite to the arm wearing the watch. Accordingly, this operation is troublesome for the user. In addition, if the user carries a hand baggage, it is difficult for the user to operate the watch.

To solve the issues, a technique to operate a watch by shaking the watch in the vertical direction has been developed (refer to, for example, Japanese Unexamined Patent Application Publication No. 2-69693). In addition, a technique to turn on an illuminator when both an acceleration switch and an inclination switch provided in a watch are turned on has been developed (refer to, for example, Japanese Unexamined Patent Application Publication No. 10-170671).

SUMMARY

In the techniques described in Japanese Unexamined Patent Application Publication No. 2-69693 and Japanese Unexamined Patent Application Publication No. 10-170671, the watches are operated by a gesture that shakes the watches in the vertical direction or a direction of the hand of the watch that indicates 12 o'clock. Such operations to move the arm in one direction frequently occur in everyday life. Accordingly, to prevent an operation that the user does not want (i.e., an erroneous operation) from being performed, the gesture needs to be detected (recognized) when the user largely and quickly moves their arm.

However, such a large movement of their arm imposes a heavy burden on the body of the user and is an unnatural movement. In addition, it is difficult for such a large movement of the arm to express a complicated operation, since the variation of the gesture is small.

One non-limiting and exemplary embodiment provides an input apparatus that controls a device to be controlled using a simple gesture while preventing an erroneous operation.

In one general aspect, the techniques disclosed here feature an input apparatus for controlling a device to be controlled. The input apparatus includes a gesture detecting unit that detects a rotational movement of a wrist of a user about a lower arm of the user and an output unit that outputs a control command for controlling the device to be controlled to the device to be controlled on the basis of a rotational direction of the rotational movement detected by the gesture detecting unit. If the gesture detecting unit detects a first rotational movement in a first rotational direction and thereafter detects a second rotational movement in a second rotational direction that is opposite to the first rotational direction, the output unit outputs a second control command corresponding to the second rotational direction without outputting a first control command corresponding to the first rotational direction.

According to an aspect of the present disclosure, the device to be controlled can be controlled by a simplified gesture while preventing an erroneous operation.

It should be noted that general or specific embodiments may be implemented as a system, a method, an integrated circuit, a computer program, a computer-readable and non-volatile recording medium, such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates an example of wrist data stored in a storage unit of the input apparatus according to the first exemplary embodiment;

FIGS. 9A and 9B illustrate determination of a position according to the first exemplary embodiment;

FIG. 11 illustrates an example of a position determination condition stored in a position determination condition storage unit according to the first exemplary embodiment;

FIG. 12B illustrates another example of a change in the acceleration over time when the wrist having the information terminal worn thereon rotates according to the first exemplary embodiment;

FIG. 26 illustrates an example of a relationship between the angle formed by the normal direction of the display screen and the vertical direction and the acceleration of gravity in each of the x-axis, y-axis, and z-axis directions;

FIG. 27 illustrates an example of a difficulty determination condition according to the fourth exemplary embodiment;

DETAILED DESCRIPTION

Outline of Disclosure

Figure 1A:
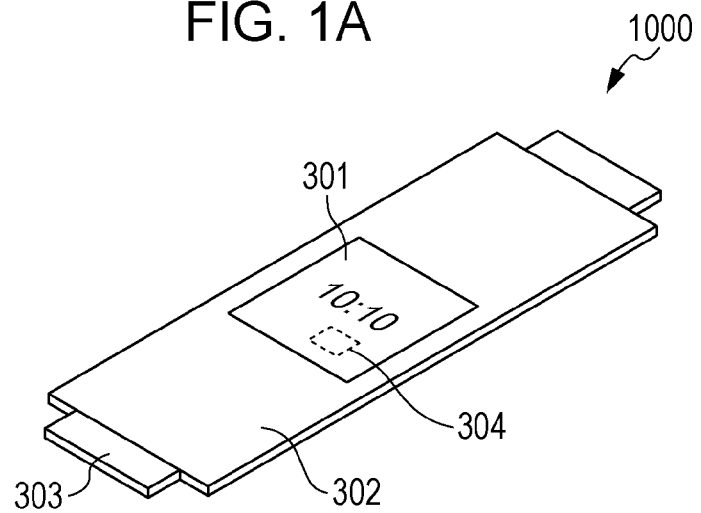
FIG. 1A is an external perspective view of an information terminal according to a first exemplary embodiment.

According to an aspect of the present disclosure, an input apparatus for controlling a device to be controlled is provided. The input apparatus includes a gesture detecting unit that detects a rotational movement of a wrist of a user about a lower arm of the user and an output unit that outputs a control command for controlling the device to be controlled to the device to be controlled on the basis of a rotational direction of the rotational movement detected by the gesture detecting unit. If the gesture detecting unit detects a first rotational movement in a first rotational direction and thereafter detects a second rotational movement in a second rotational direction that is opposite to the first rotational direction, the output unit outputs a second control command corresponding to the second rotational direction without outputting a first control command corresponding to the first rotational direction.

According to such a configuration, the control command can be output on the basis of the rotational direction of the rotational movement of the wrist of the user. A rotational movement of the wrist does not impose a heavy burden on the body of the user and is a natural movement. That is, the device to be controlled can be controlled by using a simple gesture. In addition, by using the rotational direction of the wrist, the variation of the gesture can be increased.

Note that when the user rotates their wrist, a direction in which it is difficult for the user to rotate the wrist may exist. In such a case, the user performs a preparatory movement, that is, the user rotates the wrist in a direction opposite to the direction in which the rotation is difficult. Thereafter, the user rotates the wrist in the direction in which the rotation was difficult. Accordingly, the first rotational movement followed by the second rotational movement is detected, the first rotational movement may be the preparatory movement of the second rotational movement. At that time, if the control command is output on the basis of the first rotational movement, an operation that the user does not want (i.e., an erroneous operation) is performed. Accordingly, if the second rotational movement in the second rotational direction that follows the first rotational movement in the first rotational direction is detected, the control command corresponding to the first rotational direction is not output. In this manner, output of the control command on the basis of the preparatory movement can be prevented and, thus, an erroneous operation can be prevented.

For example, the input apparatus may further include a difficulty determination unit that if the first rotational movement is detected, determines whether a state of the wrist of the user is a state in which the second rotational movement is difficult when the first rotational movement starts. If the second rotational movement that follows the first rotational movement is detected, the output unit may perform the following operation:

(i) outputting the second control command without outputting the first control command if it is determined that the state of the wrist of the user is a state in which the second rotational movement is difficult, and (ii) outputting the first control command and a second control command if it is determined that the state of the wrist of the user is not a state in which the second rotational movement is difficult.

According to such a configuration, when the first rotational movement starts, it can be determined whether the state of the wrist of the user is a state in which the second rotational movement is difficult. Accordingly, it can be determined that the preparatory movement is highly likely to be performed. As a result, if the preparatory movement is highly likely to be performed, output of the control command due to the preparatory movement (the first rotational movement) can be prevented. As a result, an erroneous operation caused by the preparatory movement can be more reliably prevented.

For example, the input apparatus may further include a posture detecting unit that detects a posture of the input apparatus and a storage unit that stores a difficulty determination condition indicating the posture of the input apparatus corresponding to the state in which the second rotational movement is difficult. The difficulty determination unit may determine whether the state of the wrist of the user is a state in which the second rotational movement is difficult by determining whether the posture of the input apparatus detected by the posture detecting unit satisfies the difficulty determination condition.

According to such a configuration, it can be determined whether the state of the wrist of the user is a state in which the second rotational movement is difficult. Accordingly, the accuracy of determination of the state of the wrist of the user can be increased.

For example, if the first rotational movement is detected, it may be determined whether the first rotational movement satisfies a predetermined condition. If the second rotational movement that follows the first rotational movement is detected, the output unit may perform the following operation:

(i) outputting the second control command without outputting the first control command if it is determined that the first rotational movement satisfies the predetermined condition, and (ii) outputting the first control command and the second control command if it is determined that the first rotational movement does not satisfy the predetermined condition.

According to such a configuration, it can be determined whether the first control command corresponding to the first rotational direction is output on the basis of the result of determination as to whether the first rotational movement satisfies the predetermined condition. Accordingly, if the first rotational movement is highly likely to be the preparatory movement, output of the first control command can be prevented. As a result, an erroneous operation caused by the preparatory movement can be more reliably prevented.

For example, the predetermined condition may be that the rotational speed of the first rotational movement is lower than a threshold speed value. Alternatively, for example, the predetermined condition may be that the rotation angle of the first rotational movement is less than a threshold angle value. Still alternatively, for example, the predetermined condition may be that the rotational speed of the first rotational movement is lower than a threshold speed value and the rotation angle of the first rotational movement is less than a threshold angle value.

According to such a configuration, the predetermined condition can be defined using at least one of the rotational speed and the rotation angle of the first rotational movement. More specifically, if at least one of the rotational speed and the rotation angle of the first rotational movement is small, output of the first control command can be prevented. The preparatory movement is performed to rotate the wrist in a direction in which it is difficult for the wrist to rotate and, thus, the magnitude of the preparatory movement is smaller than that of an intentional movement, in general. Accordingly, by using such a predetermined condition, it can be accurately determined whether the first rotational movement is the preparatory movement. As a result, an erroneous operation caused by the preparatory movement can be more reliably prevented.

For example, the device to be controlled may include a display screen and, if it is determined that the first rotational movement satisfies the predetermined condition, the output unit may further output a control command for displaying, on the display screen, information indicating that the first control command caused by the first rotational movement is not output.

According to such a configuration, the information indicating that the first control command is not output can be displayed if the first rotational movement satisfies the predetermined condition. Accordingly, the user can be aware that the first control command is not output by the first rotational movement. For example, when the first rotational movement is performed as the preparatory movement and if the information is displayed, the user can be aware that the gesture is correctly recognized. Furthermore, for example, when the first rotational movement is not the preparatory movement and if the information indicating that the first control command is not output, the user can be aware that the gesture is incorrectly recognized. Thus, the user can improve the gesture (e.g., the user rotates the wrist more).

For example, the input apparatus may further include a measuring unit that measures wrist data indicating a movement of the wrist of the user over time using a sensor mounted on the wrist of the user and a movement detecting unit that detects a start point time at which a movement of the wrist of the user is about to start using the wrist data measured by the measuring unit. The gesture detecting unit may detect the rotational movement from the wrist data measured by the measuring unit for a predetermined period of time from the start point time.

According to such a configuration, the rotational movement of the wrist can be more accurately detected.

For example, the measuring unit may measure at least one of a muscle potential on the wrist of the user and an acceleration of the wrist of the user as the wrist data, and the movement detecting unit may detect the start point time by comparing at least one of a representative value of the muscle potential and a representative value of the acceleration measured by the measuring unit with a predetermined threshold value.

According to such a configuration, by comparing at least one of the representative value of the muscle potential on the wrist and the representative value of the acceleration of the wrist with the predetermined threshold value, the start point time can be detected. Accordingly, the start point time can be detected by performing a relatively simplified process and, thus, the processing load required for detecting the start point time can be reduced.

For example, the wrist data may include the muscle potential on the wrist of the user, and the movement detecting unit may detect, as the start point time, a point in time at which the wrist data corresponding to the representative value that is greater than the predetermined threshold value is measured and at which the muscle potential indicating that a shape of a hand of the user is a predetermined shape is measured.

According to such a configuration, the point in time at which the muscle potential indicating that the shape of the user's hand is a predetermined shape is measured can be detected as the start point time. Accordingly, the frequency of erroneous detection of a gesture when the user does not intend to make a gesture can be reduced. For example, by detecting the start point time when the shape of the hand is "paper", detection of a gesture every time the user rotates a door knob to open a door can be prevented.

For example, the input apparatus may further include a position determination unit that determines whether the position of the wrist detected by the movement detecting unit at the start point time is a predetermined position. If the position determination unit determines that the position of the wrist is the predetermined position, the gesture detecting unit may detect the rotational movement.

According to such a configuration, if it is determined that the position of the wrist is the predetermined position, the rotational movement of the wrist and the rotational direction of the rotational movement can be detected. Accordingly, if the wrist is not located at the position at which a gesture is to be performed, the gesture can be prevented from being detected. That is, when the user does not intend to perform a gesture, the probability of erroneous detection of a gesture can be reduced.

For example, the sensor may include an acceleration sensor having multiple axes, and the wrist data may include an acceleration of the wrist of the user in each of directions of the multiple axes. In addition, the position determination unit may determine the position of the wrist on the basis of the accelerations of gravity in the directions of the multiple axes measured by the measuring unit at the start point time.

According to such a configuration, the position of the wrist can be determined on the basis of the accelerations of gravity in the directions of the multiple axes. Thus, the position of the wrist can be determined by using a simplified configuration.

For example, the device to be controlled may have a display screen. The input apparatus may further include a screen viewing determination unit that determines whether the user is viewing the display screen, and the output unit may output the control command on the basis of the rotational direction of the rotational movement and the result of determination made by the screen viewing determination unit.

According to such a configuration, a control command can be output on the basis of the result of determination as to whether the user is viewing the display screen. Accordingly, the control command for a gesture can be changed in accordance with the result of determination. In addition, it can be determined whether the control command for a gesture is output in accordance with the result of determination. That is, the variation of control using gestures can be increased.

For example, when the device to be controlled has a display screen and is worn on the wrist of the user so that the display screen is located on the back of the hand side, the first rotational direction may be a direction in which the wrist is rotated in an outward direction and the second rotational direction may be a direction in which the wrist is rotated in an inward direction.

According to such a configuration, when the device to be controlled is worn on the wrist of the user so that the display screen is located on the back of the hand side, a direction in which the rotation is difficult can be properly set.

For example, when the device to be controlled has a display screen and is worn on the wrist of the user so that the display screen is located on the palm of the hand side, the first rotational direction may be a direction in which the wrist is rotated in an inward direction and the second rotational direction may be a direction in which the wrist is rotated in an outward direction.

According to such a configuration, when the device to be controlled is worn on the wrist of the user so that the display screen is located on the palm of the hand side, a direction in which the rotation is difficult can be properly set.

For example, the wrist data may include the muscle potential on the wrist of the user, and the gesture detecting unit may further detect a shape of a hand of the user from the wrist data measured at the start point time. The output unit may output the control command on the basis of the rotational direction of the rotational movement and the shape of the hand.

According to such a configuration, the control command can be output by further using the shape of the user's hand as a gesture performed by the user. Accordingly, the variation of the gesture can be increased.

For example, if the shape of the hand is a predetermined shape, the output unit may output a control command corresponding to the rotational direction of the rotational movement. However, if the shape of the hand is not the predetermined shape, the output unit need not output a control command corresponding to the rotational direction of the rotational movement.

According to such a configuration, if the shape of the hand is the predetermined shape, the device to be controlled can be controlled on the basis of the rotational direction of the rotational movement of the wrist. Accordingly, erroneous operations caused by the gesture (the rotational movement of the wrist) can be reduced.

According to another aspect of the disclosure, an input apparatus for controlling a device to be controlled is provided. The input apparatus includes a sensor that detects a rotational movement of a wrist of a user about a lower arm of the user and a control circuit that outputs a control command for controlling the device to be controlled to the device to be controlled on the basis of a rotational direction of the rotational movement detected by the sensor. If the sensor detects a first rotational movement in a first rotational direction and thereafter detects a second rotational movement in a second rotational direction that is opposite to the first rotational direction, the control circuit outputs a second control command corresponding to the second rotational direction without outputting a first control command corresponding to the first rotational direction.

According to still another aspect of the disclosure, a mobile apparatus includes a display device having a display surface that displays information, a belt connected to the display device, and an acceleration sensor. A first command is submitted after verification of first information based on information detected by the acceleration sensor, detection of a first movement that follows the verification, and detection of a second movement that follows the detection of the first movement. A second command different from the first command is submitted after the verification, the detection of the first movement, and no detection of the second movement. The first information is supplied on the basis of information detected by the acceleration sensor. The first information indicates that the display surface is oriented in a direction that is opposite to a direction of gravitational force and does not have an acceleration component in a direction perpendicular to the direction of gravitational force. The first movement is part of a first rotational movement about an axis that is perpendicular to the direction of gravitational force and that is parallel to a short direction of the belt, and the second movement is part of a second rotational movement about the axis, and a rotational direction of the second rotational movement is opposite to a rotational direction of the first rotational movement.

It should be noted that these general and specific aspects may be implemented as a system, a method, an integrated circuit, a computer program, or a recording medium, such as a compact disc-read only memory (CD-ROM), or any combination of an apparatus, a system, a method, an integrated circuit, a computer program, and a recording medium.

Exemplary embodiments are described in detail below with reference to the accompanying drawings.

Note that each of the embodiments described below is a general or specific example of the present disclosure. A value, a shape, a material, a constituent element, the positions and the connection form of the constituent elements, steps, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element.

First Exemplary Embodiment

In the present exemplary embodiment, a device to be controlled is an information terminal of a wrist wearable type (typically, a smart watch), and an input apparatus is integrated into the information terminal as a part of the information terminal. That is, the following description is made with reference to the information terminal functioning as the device to be controlled and including the input apparatus.

External View of Information Terminal

Figure 1B:
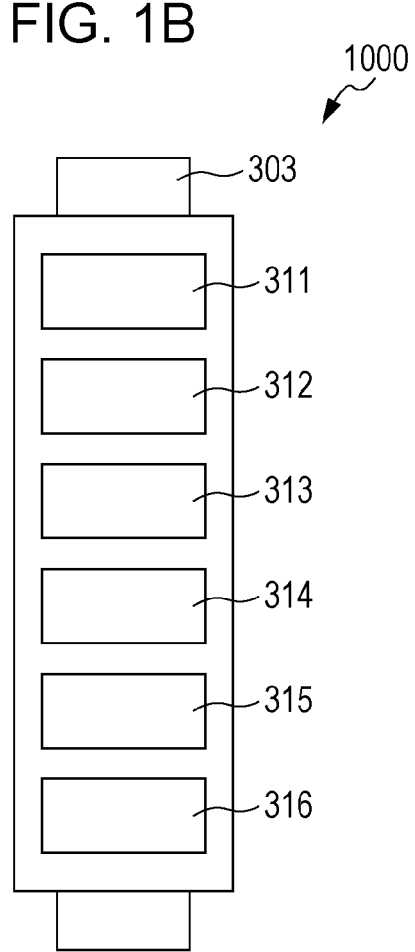
FIG. 1B is a back view of the information terminal with a belt placed flat according to the first exemplary embodiment.

FIG. 1A is an external perspective view of an information terminal 1000 according to a first exemplary embodiment. FIG. 1B is a back view of the information terminal 1000 with a belt 302 placed flat according to the first exemplary embodiment.

The input apparatus 1000 includes a main body 301, the belt 302, a hook 303, an acceleration sensor 304, and a plurality of electrodes 311 to 316.

The main body 301 contains a plurality of devices for operating the information terminal 1000. The main body 301 includes the input apparatus 100 and a display screen (described in more detail below). The display screen displays a variety of types of information each corresponding to one of operation modes of the information terminal 1000.

The belt 302 is a member used to fix the information terminal 1000 to a wrist of a user. By wrapping the belt 302 around the user's wrist, the user can have the information terminal 1000 secured to their wrist.

The hook 303 is a member used to secure the belt 302 to the wrist. That is, the hook 303 maintains the state in which the belt 302 is wrapped around the wrist.

As illustrated in FIG. 1B, the electrodes 311 to 316 are disposed on the back surface of the belt 302. That is, the electrodes 311 to 316 are exposed on the back surface of the belt 302. As used herein, the term "back surface" refers to a surface that is in contact with the wrist of a user when the information terminal 1000 is worn on the user's wrist. The electrodes 311 to 316 measure the electric potentials of the skin of the wrist of the user at different positions. Hereinafter, the electric potentials measured by the electrodes 311 to 316 are referred to as "muscle potentials".

The electrodes 311 to 314 are used as measuring electrodes for channels 1 to 4 (hereinafter referred to as "measuring electrodes Ch1 to Ch4". Each of the measuring electrodes Ch1 to Ch4 is used to measure the electric potential at a position at which the measuring electrode is in contact with the skin.

The electrode 315 is used as an earth electrode Che. The earth electrode Che is used to earth (ground) electric devices included in the information terminal 1000.

The electrode 316 is used as a reference electrode Chref. The reference electrode Chref is used to measure a reference potential for normalizing the electric potentials measured by the measuring electrodes Ch1 to Ch4. The term "normalization" of a potential refers to adjustment of an electric potential on the basis of a predetermined rule. That is, the electric potentials measured by the measuring electrodes Ch1 to Ch4 are adjusted using the reference potential measured by the reference electrode Chref. According to the present exemplary embodiment, the difference value between each of the electric potentials measured by the measuring electrodes Ch1 to Ch4 and the electric potential measured by the reference electrode Chref is used as a normalized potential.

The acceleration sensor 304 senses the acceleration of the information terminal 1000. According to the present exemplary embodiment, the acceleration sensor 304 measures the acceleration in each of three axes (the x-axis, y-axis, and z-axis).

Figure 2A:
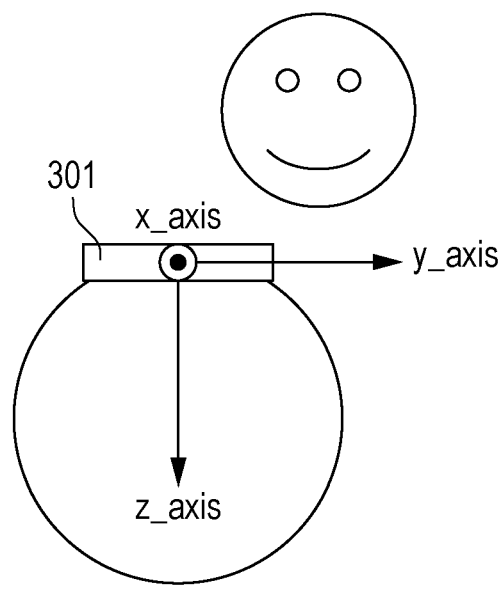
FIGS. 2A and 2B illustrate three axes of an acceleration sensor of the information terminal according to the first exemplary embodiment.
Figure 2B:
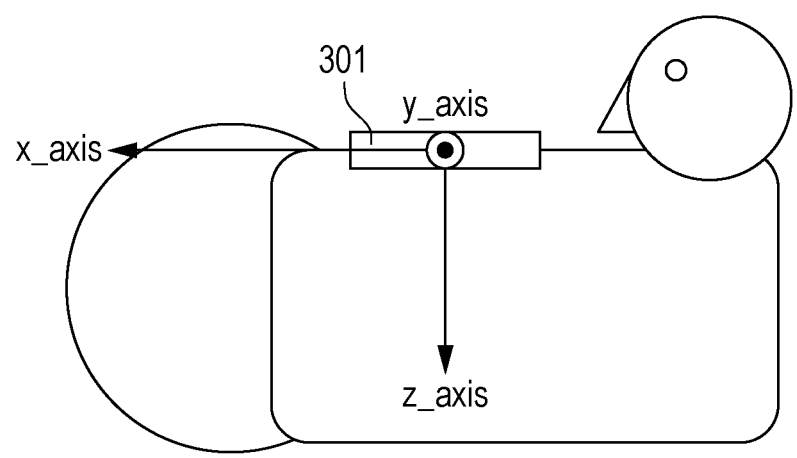

FIGS. 2A and 2B illustrate the three axes of the acceleration sensor 304 of the information terminal 1000 according to the first exemplary embodiment. More specifically, FIG. 2A is a front view of a user putting forward their hand on which the user wears the information terminal 1000, and FIG. 2B is a left side view of the user putting forward their hand on which the user wears the information terminal 1000.

As illustrated in FIGS. 2A and 2B, the x-axis and the y-axis are perpendicular to each other in the plane of the display screen. When the information terminal 1000 is worn on the wrist of a user, the x-axis direction coincides with a direction in which the upper arm of the user extends. When the user stands up and faces frontward, the frontward direction is the X-axis direction (refer to FIG. 3). The z-axis direction is perpendicular to the plane of the display screen.

In FIGS. 2A and 2B, if the information terminal 1000 is accelerated in the direction of an arrow, positive acceleration is detected. However, if the information terminal 1000 is accelerated in a direction opposite to the direction of an arrow, negative acceleration is detected.

In addition, according to the present exemplary embodiment, the acceleration sensor 304 can further measure the acceleration of gravity. Accordingly, the acceleration sensor 304 detects an acceleration of −1G in the vertical direction at all times. Accordingly, the inclination (the posture) of the information terminal 1000 can be also measured from the output of the acceleration sensor 304.

Definition of Rotational Direction of Wrist

Figure 3:
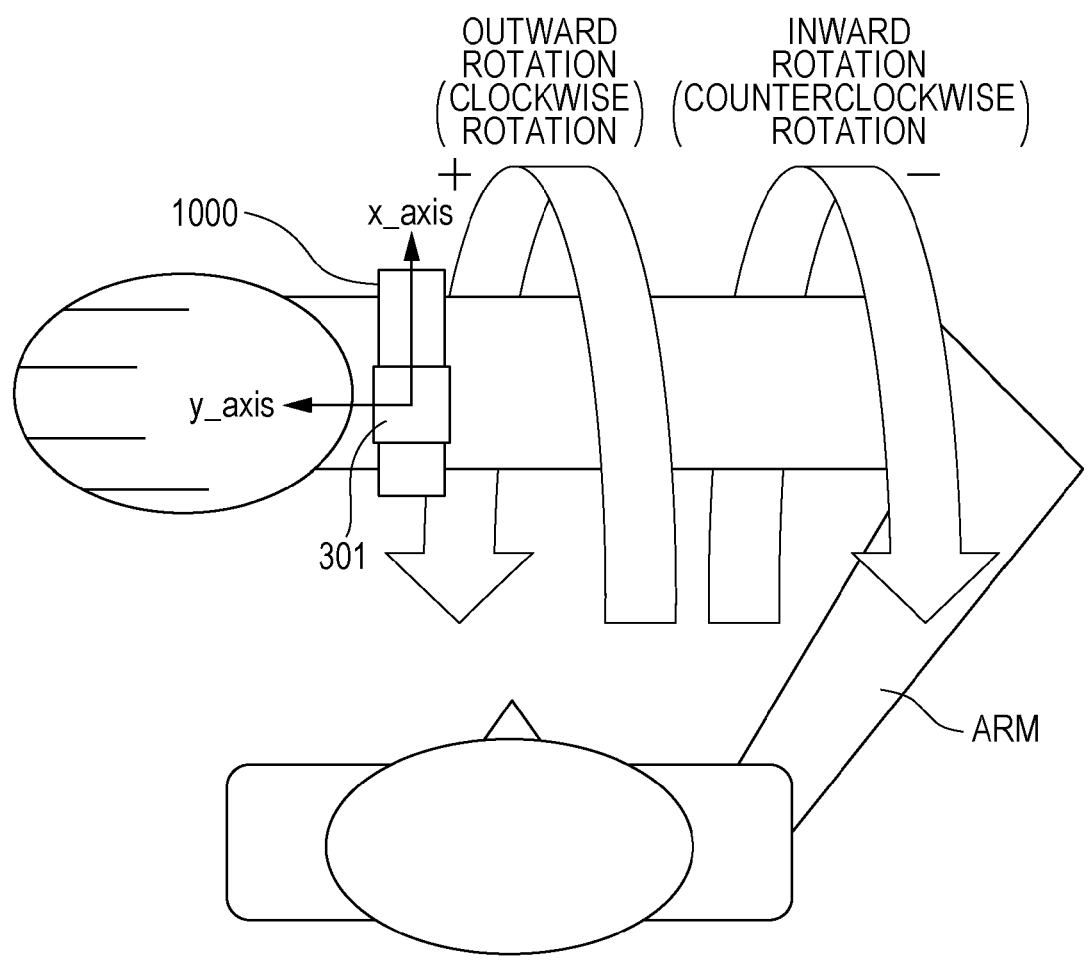
FIG. 3 is a top view of a user who rotates their wrist to operate the information terminal according to the first exemplary embodiment.

The definition of the rotational direction of a wrist according to the present exemplary embodiment is described below. FIG. 3 is a top view of a user who rotates their wrist to operate the information terminal 1000 according to the first exemplary embodiment.

As illustrated in FIG. 3, the clockwise rotation of the right wrist is referred to as "outward rotation". In addition, the counterclockwise rotation of the right wrist is referred to as "inward rotation".

Note that the inward rotation and the outward rotation of the left wrist are the opposite of those of the right wrist. That is, the clockwise rotation of the left wrist is referred to as "inward rotation", and the counterclockwise rotation of the left wrist is referred to as "outward rotation".

Functional Configuration of Information Terminal

Figure 4:
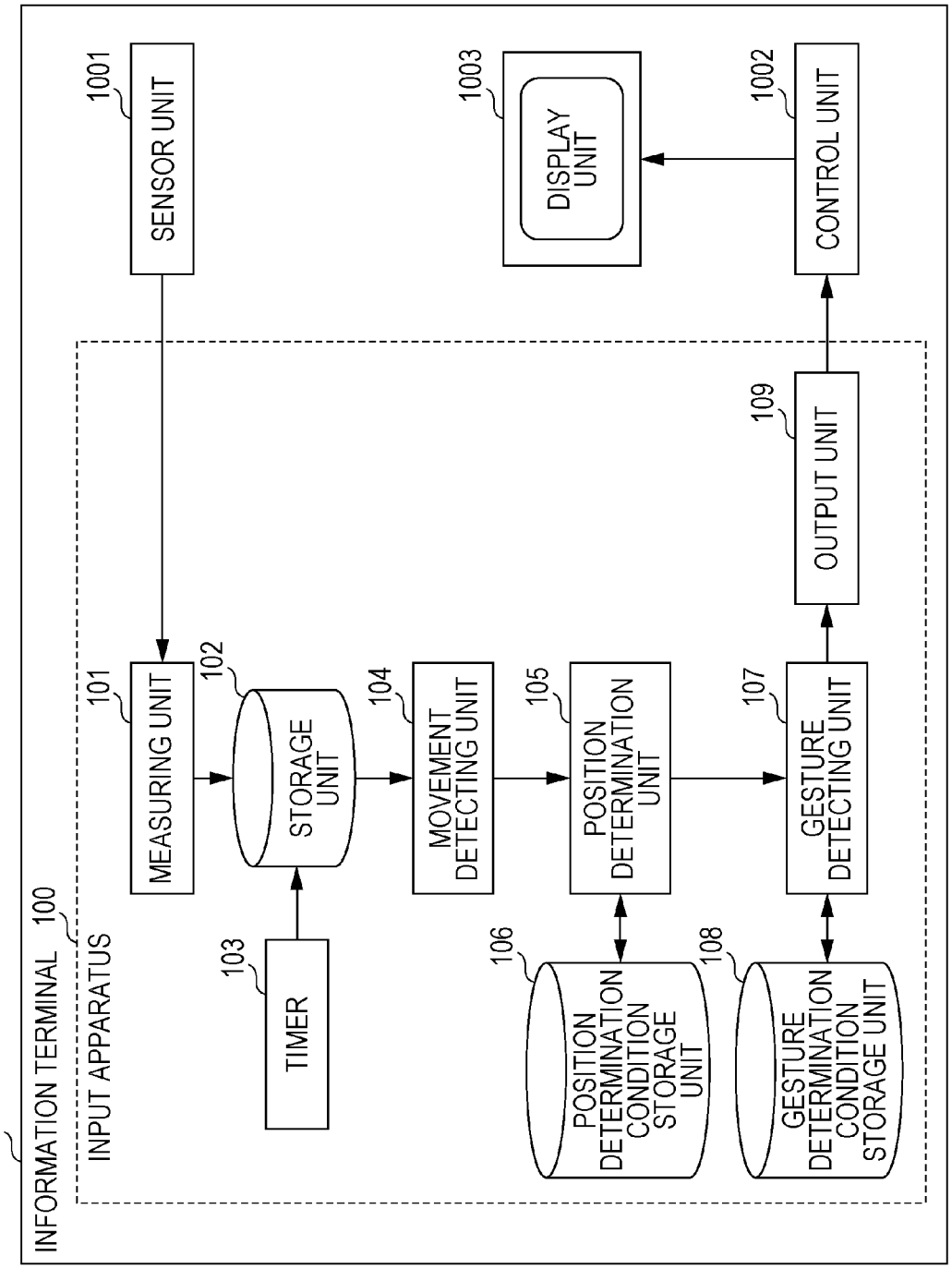
FIG. 4 is a block diagram of the functional configuration of the information terminal according to the first exemplary embodiment.

FIG. 4 is a block diagram of the functional configuration of the information terminal 1000 according to the first exemplary embodiment. The information terminal 1000, which is a wearable wrist device, includes the input apparatus 100, a sensor unit 1001, a control unit 1002, and a display unit 1003.

The sensor unit 1001 corresponds to the acceleration sensor 304 and the electrodes 311 to 316. The sensor unit 1001 senses the acceleration and the muscle potentials of the wrist.

The input apparatus 100 is provided to control the information terminal 1000 using a gesture of the user. The input apparatus 100 includes a measuring unit 101, a storage unit 102, a timer 103, a movement detecting unit 104, a position determination unit 105, a position determination condition storage unit 106, a gesture detecting unit 107, a gesture determination condition storage unit 108, and an output unit 109.

The measuring unit 101 measures time-series wrist data indicating the movement of the wrist of the user using the sensor unit 1001. More specifically, the measuring unit 101 repeatedly measures the wrist data at predetermined intervals (e.g., 10-ms intervals).

The storage unit 102 is formed from, for example, a semiconductor memory or a hard disk drive. The storage unit 102 stores the wrist data measured by the measuring unit 101 together with the measurement time obtained from the timer 103.

The movement detecting unit 104 detects the point in time at which the movement of the wrist of the user is about to start using the wrist data stored in the storage unit 102 (a start point time). That is, the movement detecting unit 104 detects the point in time at which movement of the wrist of the user having a magnitude that is larger than a predetermined magnitude is produced.

The position determination unit 105 determines whether the wrist of the user is located at a predetermined position at the start point time measured by the movement detecting unit 104. More specifically, the position determination unit 105 refers to the position determination condition stored in the position determination condition storage unit 106 and determines the position of the wrist of the user corresponding to the wrist data obtained at the start point time detected by the movement detecting unit 104. Subsequently, the position determination unit 105 determines whether the determined position of the wrist is a predetermined position.

As used herein, the term "predetermined position" refers to a predetermined position at which a gesture is to be performed to control the information terminal 1000. That is, when the wrist of the user is located at the predetermined position, a gesture is detected (recognized). For example, the predetermined position is a position at which the user views the display screen of the information terminal 1000.

The position determination condition storage unit 106 is formed from, for example, a semiconductor memory or a hard disk drive. The position determination condition storage unit 106 stores a position determination condition indicating a correspondence between each of a plurality of wrist data items and one of a plurality of positions of the wrist.

The gesture detecting unit 107 detects the rotational movement of the wrist about the lower arm of the user. According to the present exemplary embodiment, if the position determination unit 105 determines that the position of the wrist of the user at the start point time is the predetermined position, the gesture detecting unit 107 detects, as a gesture of the user, the rotational movement of the wrist about the lower arm of the user from the wrist data measured by the measuring unit 101 for a predetermined period of time from the start point time. That is, if the position of the wrist is a predetermined position, the gesture detecting unit 107 performs a wrist gesture recognition process using the wrist data obtained after the start point time.

The gesture determination condition storage unit 108 stores the conditions used for determining a gesture from the wrist data. The gesture detecting unit 107 detects a gesture by referring to the conditions stored in the gesture determination condition storage unit 108.

The output unit 109 outputs a control command for controlling the information terminal 1000 on the basis of the result of detection output from the gesture detecting unit 107. More specifically, if the gesture detecting unit 107 detects a rotational movement of the wrist, the output unit 109 outputs, to the control unit 1002, at least a control command corresponding to the rotational direction of the rotational movement.

As used herein, the term "control command" refers to an instruction, a command, a message, or data for controlling the information terminal 1000. More specifically, the control command is, for example, an instruction to switch a screen to another screen. Alternatively, the control command may be wrist data measured by the measuring unit 101.

The control unit 1002 controls the information terminal 1000 on the basis of a control command output from the output unit 109.

The display unit 1003 displays an image on the display screen in accordance with an instruction output from the control unit 1002.

Operation Performed by Information Terminal

The processing performed by the information terminal 1000 having the above-described configuration is described below.

Figure 5:
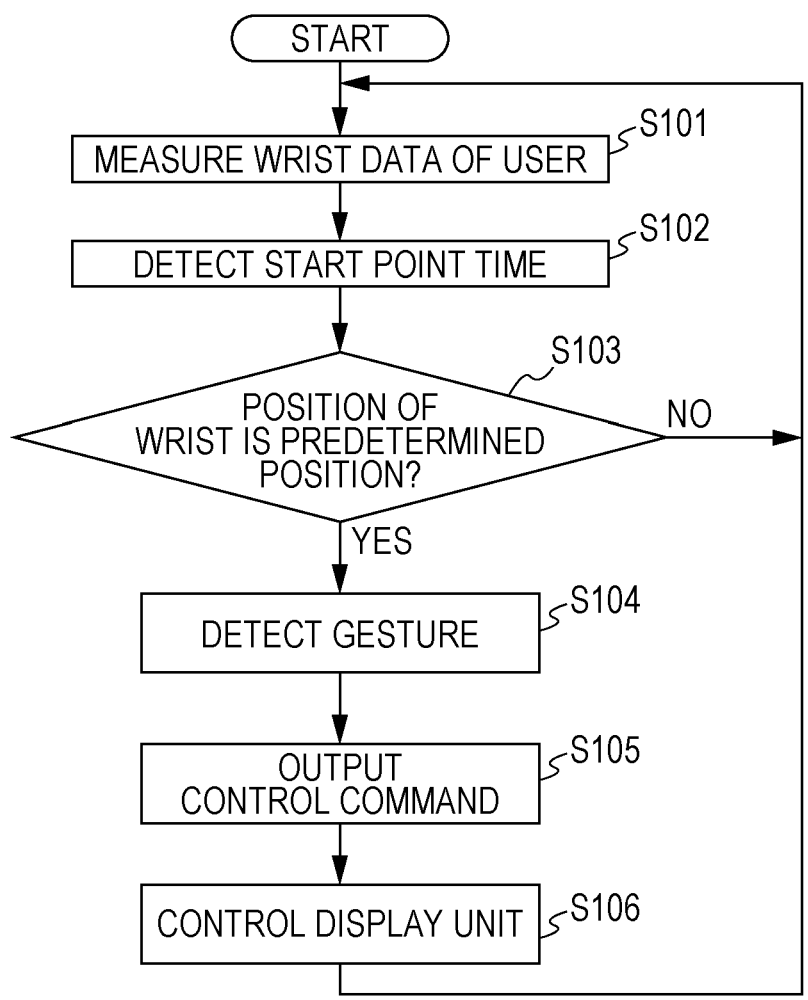
FIG. 5 is a flowchart of the processing performed by the information terminal according to the first exemplary embodiment.

FIG. 5 is a flowchart of the processing performed by the information terminal 1000 according to the first exemplary embodiment. The processes performed in steps illustrated in FIG. 5 are described below with reference to the drawings illustrating a particular examples.

<Step S101>

The measuring unit 101 measures the wrist data of the user using the sensor unit 1001 at predetermined time intervals. As used herein, the term "wrist data" refers to data indicating the movement of the wrist of the user. That is, the wrist data is data used for quantifying the movement of the wrist. According to the present exemplary embodiment, the wrist data includes the muscle potentials measured by the electrodes 311 to 316 that are in contact with the skin of the wrist and the acceleration measured by the acceleration sensor 304 disposed in the main body 301.

The wrist data measured by the measuring unit 101 is stored in the storage unit 102 in association with the time output from the timer 103.

FIG. 6 illustrates an example of the wrist data stored in the storage unit 102 of the input apparatus 100 according to the first exemplary embodiment. The wrist data measured at a sampling rate of 1 kHz are illustrated in FIG. 6.

In this example, the wrist data includes items 901 to 908. The item 901 indicates a measurement date and time. The item 902 indicates a difference value between the electric potential acquired by the measuring electrode Ch1 and the electric potential acquired by the reference electrode Chref. The item 903 indicates a difference value between the electric potential acquired by the measuring electrode Ch2 and the electric potential acquired by the reference electrode Chref. The item 904 indicates a difference value between the electric potential acquired by the measuring electrode Ch3 and the electric potential acquired by the reference electrode Chref. The item 905 indicates a difference value between the electric potential acquired by the measuring electrode Ch4 and the electric potential acquired by the reference electrode Chref. The item 906 indicates the acceleration in the x-axis direction illustrated in FIGS. 2A and 2B. The item 907 indicates the acceleration in the y-axis direction illustrated in FIGS. 2A and 2B. The item 908 indicates the acceleration in the z-axis direction illustrated in FIGS. 2A and 2B.

<Step S202>

The movement detecting unit 104 detects the start point time at which the movement of the wrist of the user starts using the wrist data measured by the measuring unit 101 in step S201. More specifically, the movement detecting unit 104 acquires the wrist data from the storage unit 102 first. Subsequently, the movement detecting unit 104 compares at least one of the representative value of the muscle potential and the representative value of the acceleration included in the acquired wrist data with a predetermined threshold value. Thus, the movement detecting unit 104 detects the start point time.

As used herein, the term "representative value" refers to a value used for quantifying the magnitude of the movement of the wrist of the user. More specifically, the representative value is, for example, a statistical value obtained from at least one of the muscle potential and the acceleration included in the wrist data. For example, the representative value is the average value, the highest value, the median value, the sum, or the absolute sum. In addition, the predetermined threshold value is used for identifying the start of the movement of the wrist. The predetermined threshold value can be determined empirically or experimentally.

Figure 7:
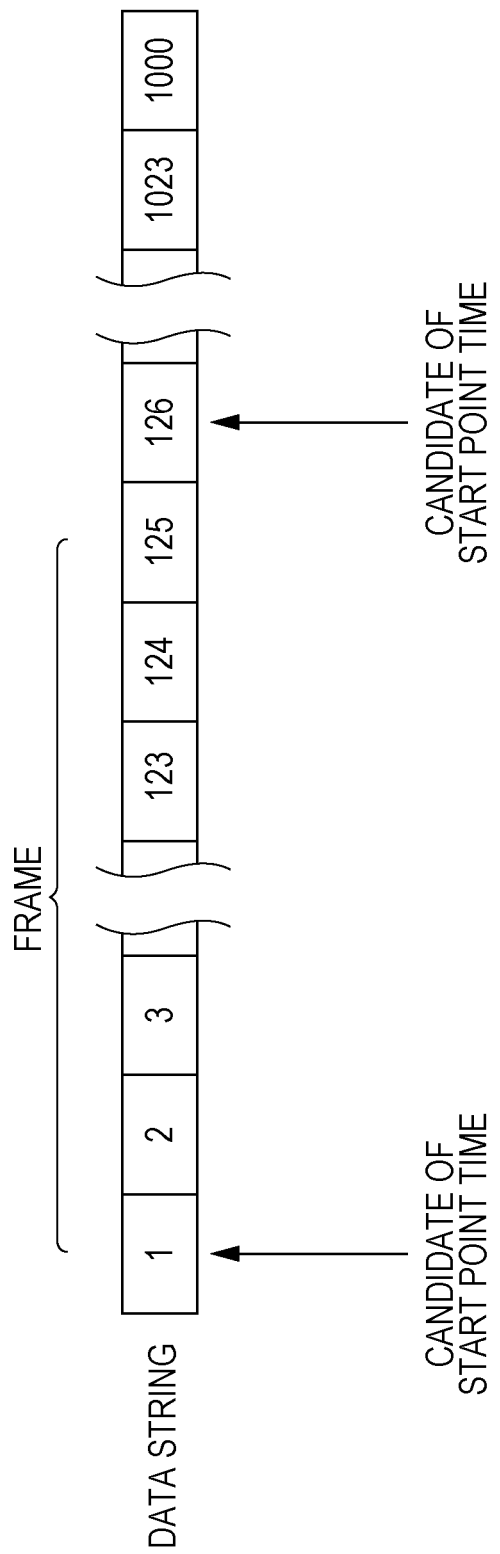
FIG. 7 illustrates a sequence of wrist data used for detecting a start point time according to the first exemplary embodiment.
Figure 8:
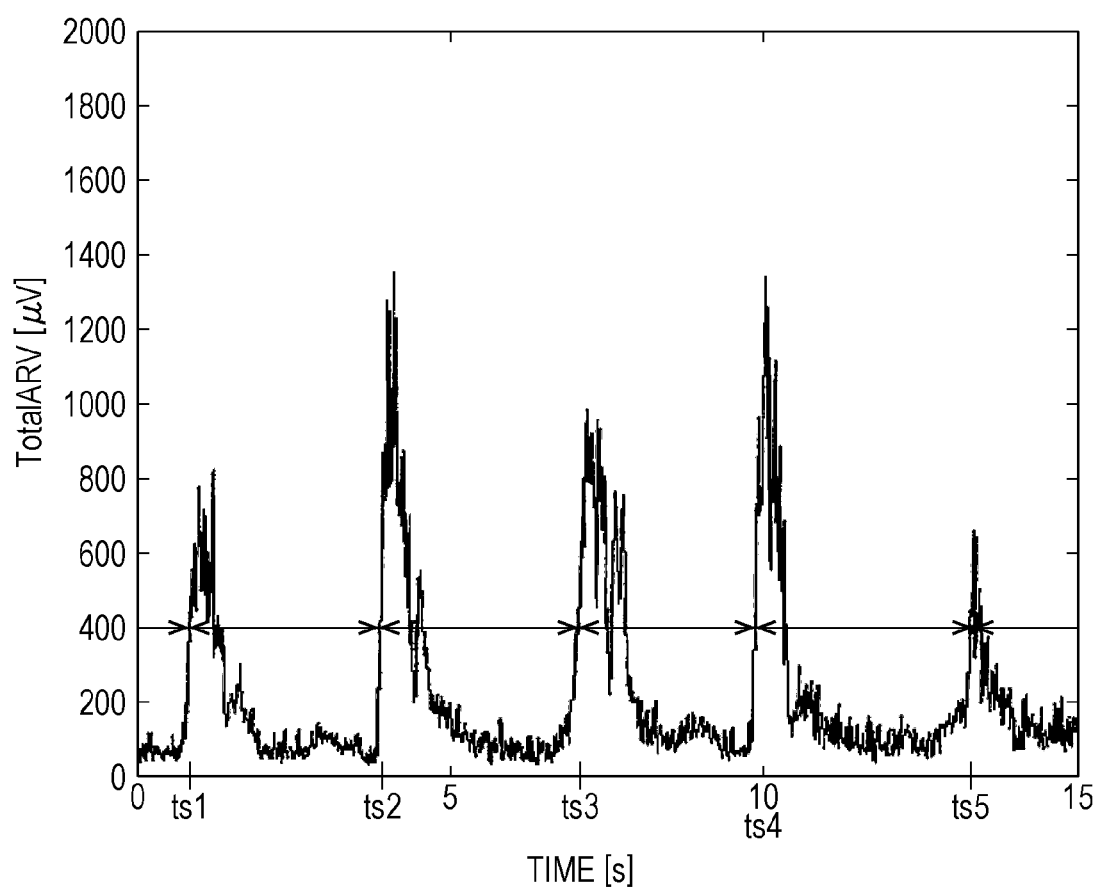
FIG. 8 is a graph illustrating comparison in detection of the start point time according to the first exemplary embodiment.

As a particular example, the case in which the start point time is detected using the muscle potential is described below with reference to FIGS. 7 and 8. FIG. 7 illustrates a sequence of wrist data used for detecting the start point time according to the first exemplary embodiment. FIG. 8 is a graph illustrating comparison in detection of the start point time according to the first exemplary embodiment.

The movement detecting unit 104 acquires the sequence of wrist data from the storage unit 102 on a predetermined time interval basis first. Hereinafter, the predetermined time interval is referred to as a "frame". For example, if one frame is 125 ms and the sampling rate is 1 kHz, the sequence of wrist data including 125 wrist data items (125 records illustrated in FIG. 6) are acquired.

Subsequently, the movement detecting unit 104 calculates, as the representative value, the absolute sum (TotalARV) of the muscle potentials included in the sequence of wrist data of the plurality of channels. For example, the movement detecting unit 104 calculates the representative value by summing the absolute values in the items 902 to 905 in FIG. 6 for 125 records.

Subsequently, the movement detecting unit 104 compares the calculated representative value with the predetermined threshold value. If the representative value is greater than the predetermined threshold value, the movement detecting unit 104 determines that the start time of the sequence of wrist data is the start point time.

FIG. 8 is a graph illustrating the TotalARV that varies over time according to the first exemplary embodiment. In FIG. 11, the abscissa represents a time, and the ordinate represents the TotalARV.

For example, if the predetermined threshold value is "400" µV, each of times ts1, ts2, ts3, ts4, and ts5 at which the TotalARV exceeds 400 µV is detected as the start point time. Note that the predetermined threshold value can be determined to be any value that can tell a rotational movement of the wrist from a normal movement of the wrist. The predetermined time after the start point time is detected may be set so that the start point time is not detected.

<Step S103>

If the start point time is detected in step S102, the position determination unit 105 determines the position of the wrist of the user at the start point time. Subsequently, the position determination unit 105 determines whether the determined position of the wrist is the predetermined position. If it is determined that the position of the wrist is the predetermined position (Yes in S103), the processing proceeds to the next step S104. However, if it is determined that the position of the wrist is not the predetermined position (No in S103), the processing returns to step S101.

As used herein, the term "predetermined position" refers to a predetermined position set for determination of a gesture. For example, the predetermined position is a position in a region in which the user's wrist is located when the user views the display screen of the information terminal 1000.

More specifically, the position determination unit 105 determines the posture (the orientation) of the information terminal 1000 with respect to the vertical direction using the acceleration measured by the acceleration sensor 304 and determines the position of the wrist on the basis of the determined posture. The determination of the orientation of the information terminal 1000 is described in detail first with reference to FIGS. 9A and 9B.

FIGS. 9A and 9B illustrate determination of the position according to the first exemplary embodiment. More specifically, FIG. 9A illustrates the result of measurement of the acceleration in each of the axis directions that are perpendicular to the vertical direction of the display screen. FIG. 9B illustrates the result of measurement of the acceleration in each of the axis directions when the display screen diagonally crosses the vertical direction.

In the graphs illustrated in FIGS. 9A and 9B, the abscissa represents a time, and the ordinate represents the magnitude of the acceleration of gravity. Note that in FIGS. 9A and 9B, the acceleration of gravity is sensed by the acceleration sensor 304.

As described above, according to the present exemplary embodiment, the acceleration sensor 304 senses the acceleration of gravity. Accordingly, the measuring unit 101 measures the components of the acceleration of gravity in the x-axis, y-axis, and z-axis directions using the acceleration sensor 304.

For example, as illustrated in FIG. 9A, if the z-axis direction is parallel to the vertical direction (i.e., if the xy plane (the display screen) is perpendicular to the vertical direction), an acceleration of "−1 G" is measured in the z-axis direction, and no acceleration is detected in each of the x-axis direction and the y-axis direction. In contrast, as illustrated in FIG. 9B, when the x-axis direction is perpendicular to the vertical direction and if the y-axis direction and the vertical direction form an angle of 135 degrees and the z-axis direction and the vertical direction form an angle of 45 degrees, an acceleration of "+G/√2" is measured in the z-axis direction, and an acceleration of "−G/√2" is measured in the z-axis direction. In this manner, the accelerations of gravity measured in the axis directions differ from one another in accordance with the posture of the information terminal 1000 with respect to the vertical direction.

Accordingly, the position determination unit 105 determines the posture of the information terminal 1000 on the basis of the accelerations of gravity in a plurality of axis directions measured at the start point time. According to the present exemplary embodiment, the posture of the information terminal 1000 is given using the angles of rotation of the vertical direction about the axis directions.

A technique for determining the position of the wrist using a correlation between the posture of the information terminal 1000 worn on the wrist and the position (the state) of the wrist is described next with reference to FIGS. 10A to 10C and FIG. 11.

Figure 10A:
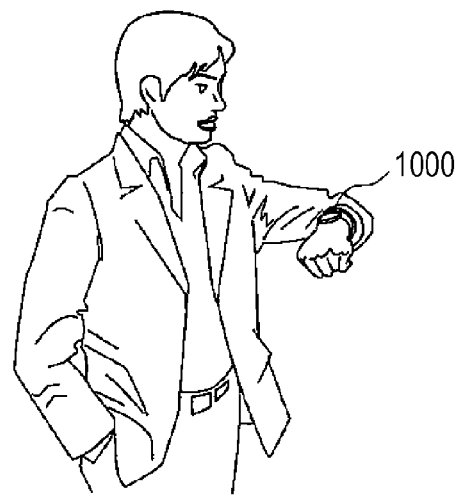
FIG. 10A illustrates a correlation between the posture of the information terminal and the position of the wrist according to the first exemplary embodiment.
Figure 10B:
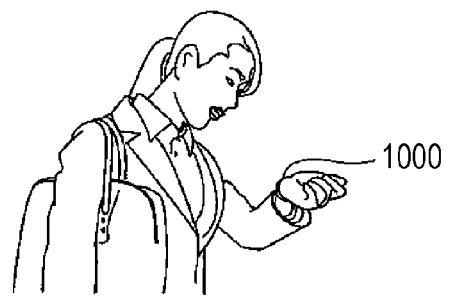
FIG. 10B illustrates a correlation between the posture of the information terminal and the position of the wrist according to the first exemplary embodiment.
Figure 10C:
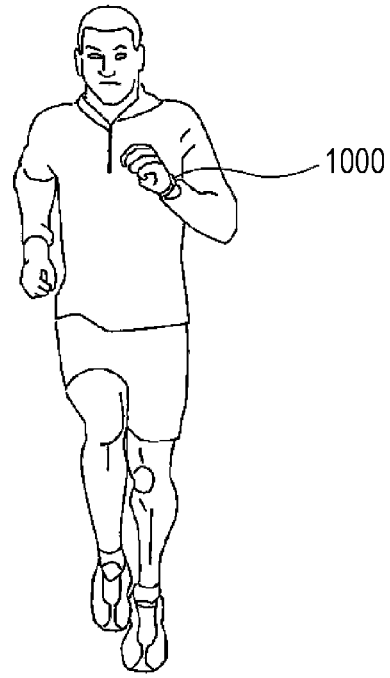
FIG. 10C illustrates a correlation between the posture of the information terminal and the position of the wrist according to the first exemplary embodiment.

FIGS. 10A to 10C illustrate a correlation between the posture of the information terminal 1000 and the position of the wrist according to the first exemplary embodiment. More specifically, FIG. 10A illustrates an example of the position of the wrist when a user views the display screen of the information terminal 1000 worn on their wrist so that the main body 301 (the display screen) is disposed on the back of the hand side (hereinafter, the position is referred to as a "wrist position 1"). FIG. 10B illustrates an example of the position of the wrist when the user views the display screen of the information terminal 1000 worn on their wrist so that the main body 301 (the display screen) is disposed on the palm of the hand side (hereinafter, the position is referred to as a "wrist position 2"). FIG. 10C illustrates an example of the position of the wrist when the user is running or walking without viewing the display screen of the information terminal 1000 worn on their wrist so that the main body 301 (the display screen) is disposed on the back of the hand side (hereinafter, the position is referred to as a "wrist position 3").

FIG. 11 illustrates an example of the position determination condition stored in the position determination condition storage unit 106 according to the first exemplary embodiment. The position determination condition is information indicating a correspondence between the position of the wrist and the posture of the information terminal 1000. In FIG. 11, the posture of the information terminal 1000 is defined as the ranges of the angle of rotation of the vertical direction about the axes.

An item 1601 indicates the position of the wrist. Each of items 1602 to 1604 indicates the range of the angle of rotation of the vertical direction about one of the axes corresponding to the wrist position in the item 1601.

The position determination unit 105 refers to the position determination conditions and determines the position of the wrist corresponding to the determined posture of the information terminal 1000. Thereafter, the position determination unit 105 determines whether the determined position of the wrist is the predetermined position (e.g., the wrist position 1).

In this manner, the position determination unit 105 determines the position of the wrist on the basis of the acceleration of gravity in each of a plurality of axis directions measured at the start point time.

<Step S104>

Subsequently, the gesture detecting unit 107 detects the rotational movement of the wrist of the user about the rower arm from the wrist data measured by the measuring unit 101 for a predetermined time interval from the start point time. In addition, the gesture detecting unit 107 detects, as the gesture of the user, the shape of user's hand from the wrist data measured at the start point time.

Figure 12A:
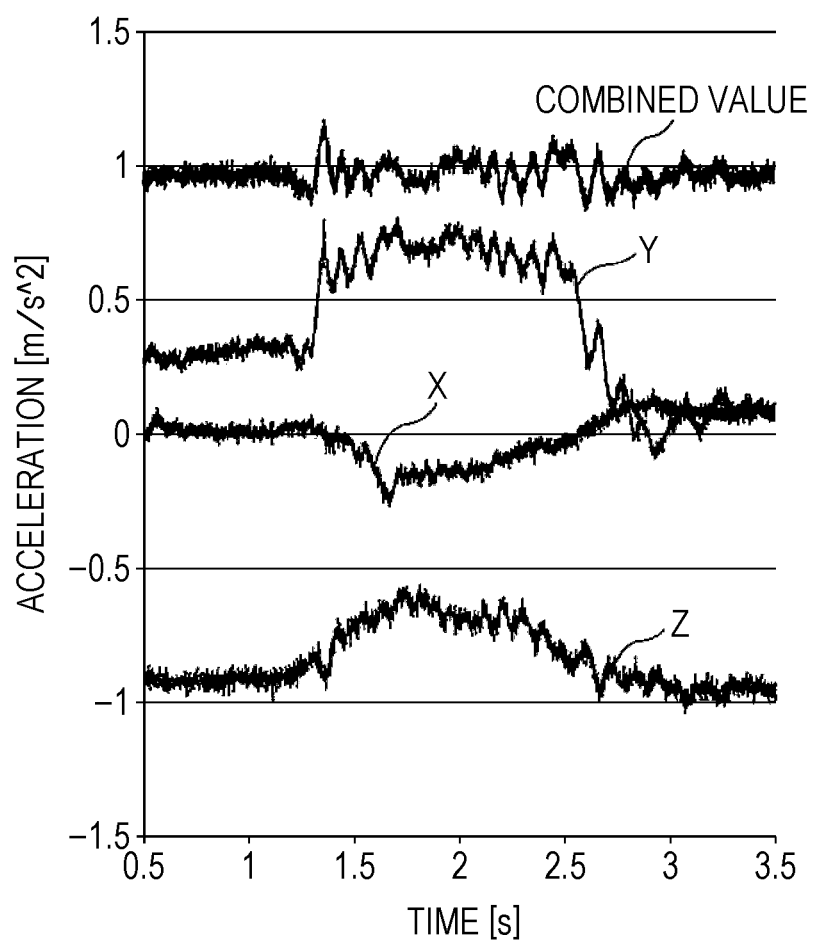
FIG. 12A illustrates an example of a change in the acceleration over time when the wrist having the information terminal worn thereon rotates according to the first exemplary embodiment.

Detection of the rotational movement of the wrist and the rotational direction of the rotational movement is described first with reference to FIGS. 12A and 12B.

FIGS. 12A and 12B are graphs illustrating an example of a change in the acceleration over time measured when the wrist having the information terminal 1000 of the first exemplary embodiment secured thereon rotates. More specifically, FIG. 12A illustrates a change in the acceleration over time when the wrist rotates inward, and FIG. 12B illustrates a change in the acceleration over time when the wrist rotates outward. In FIGS. 12A and 12B, the abscissa represents a time, and the ordinate represents the acceleration.

As illustrated in FIGS. 12A and 12B, a change in the acceleration over time in the inward rotation differs from that in the outward rotation. Accordingly, the gesture detecting unit 107 compares the acceleration measured for a predetermined period of time from the start point time with each of a plurality of predetermined acceleration patterns to detect the rotational movement of the wrist and the rotational direction of the rotational movement of the wrist.

The acceleration patterns are an example of the gesture determination conditions stored in the gesture determination condition storage unit 108. Each of the acceleration patterns indicates a rotational movement of the wrist and a temporal change in the acceleration of the rotational movement in the rotational direction of the rotational movement.

More specifically, the gesture detecting unit 107 identifies, among the plurality of the acceleration patterns, the acceleration pattern having a temporal change that is similar to that of the measured acceleration using a pattern matching technique. More specifically, by using, for example, a mutual correlation function, the gesture detecting unit 107 calculates the similarity between the value measured by the acceleration sensor for a predetermined period of time from the start point time when the gesture detecting unit 107 detects a gesture and each of the acceleration patterns stored in the gesture determination condition storage unit 108. Thereafter, the gesture detecting unit 107 selects a gesture having the highest similarity as a presumed gesture. Thereafter, the gesture detecting unit 107 detects the rotational movement corresponding to the identified acceleration pattern as a gesture.

Detection of the shape of the user's hand is described next with reference to FIGS. 13 and 14.

Figure 13:
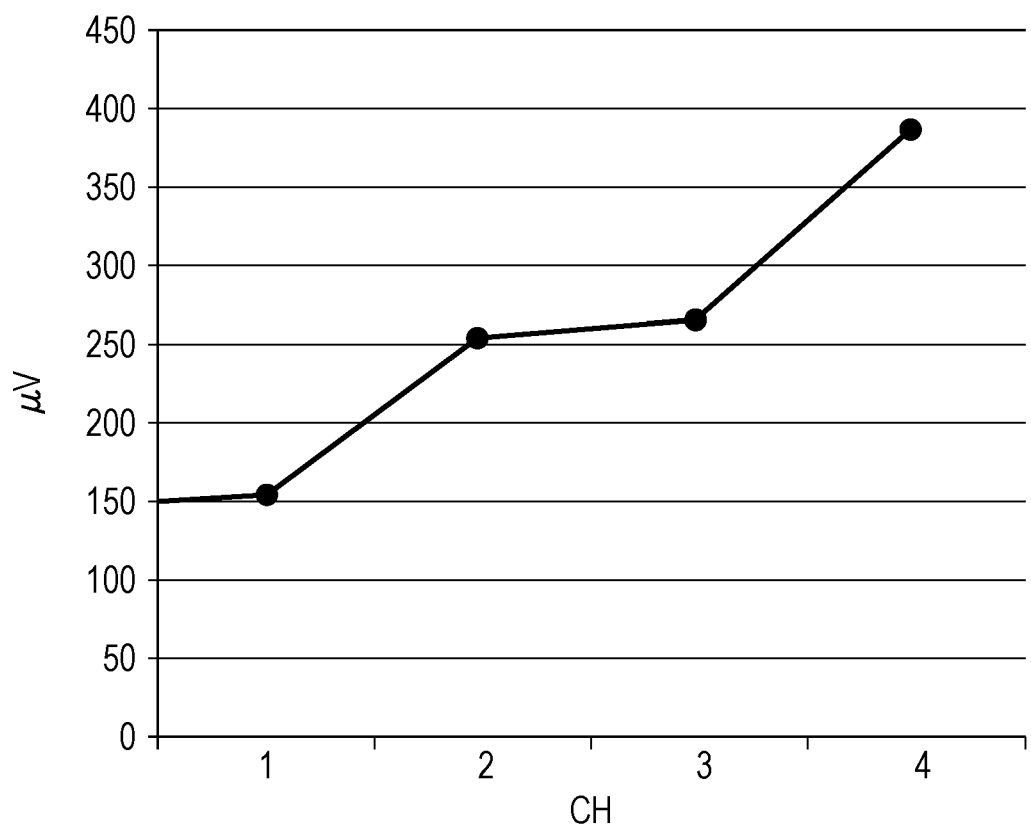
FIG. 13 is a graph illustrating the representative value of each of channels calculated in the first exemplary embodiment.
Figure 14:
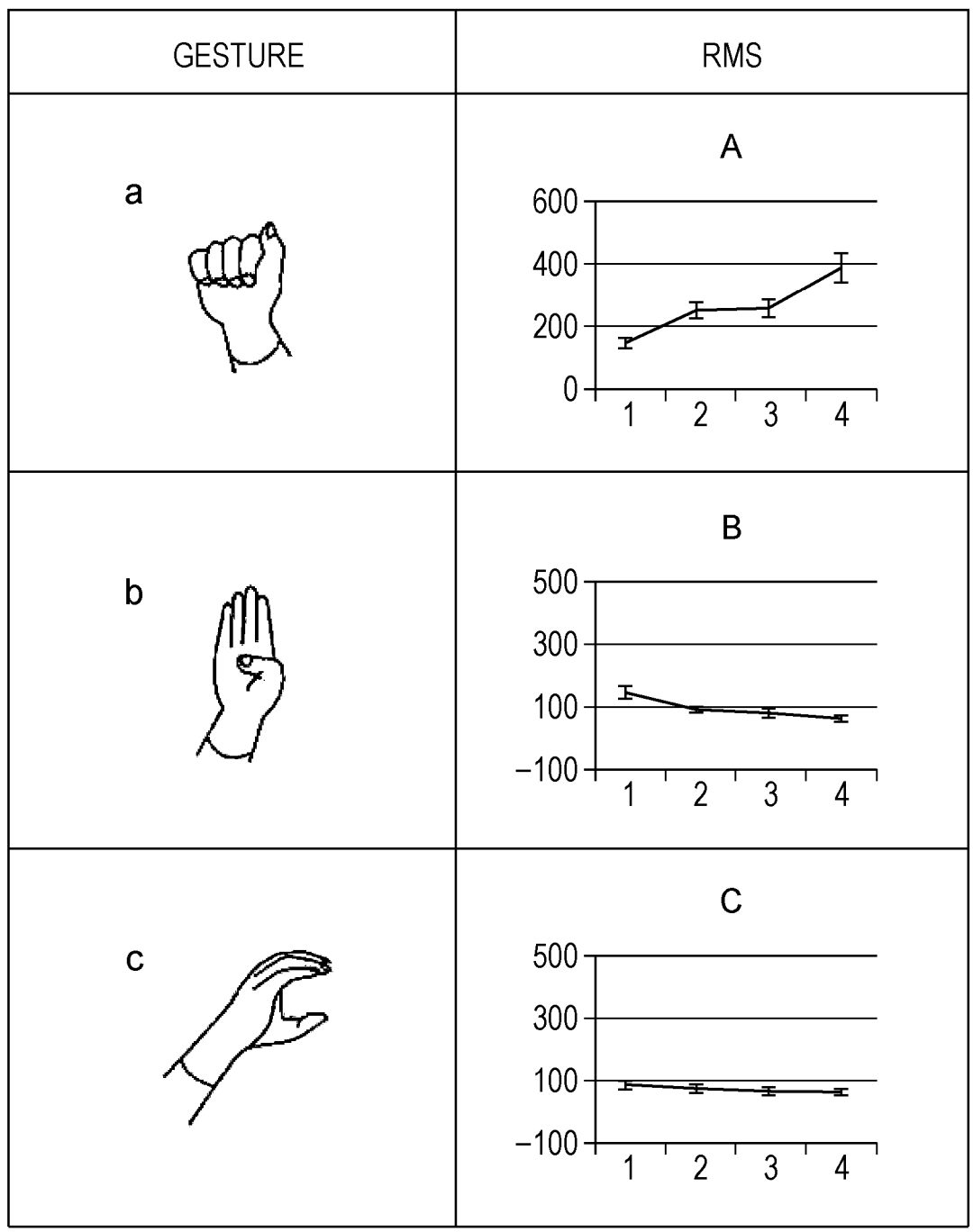
FIG. 14 illustrates an example of gesture determination conditions according to the first exemplary embodiment.

FIG. 13 is a graph illustrating the representative value of each of the channels calculated in the first exemplary embodiment. FIG. 14 illustrates an example of the gesture determination conditions according to the first exemplary embodiment. In the graphs illustrated in FIGS. 13 and 14, the abscissa represents the channels, and the ordinate represents the electric potential.

The gesture detecting unit 107 detects the shape of the user's hand from the muscle potentials measured by the measuring unit 101 at the start point time. The shape of the hand is formed by bending and straightening the fingers. Examples of the shape of the hand include rock, paper, and scissors in the game called rock, paper, scissors.

More specifically, the shape of the user's hand is detected in the following manner.

The gesture detecting unit 107 calculates the representative value of the muscle potential for each of the channels included in a frame corresponding to the start point time first. An example of the representative value is the root mean square (RMS).

As a result, as illustrated in FIG. 13, the RMS for a predetermined period of time from the start point time is calculated for each of the channels.

Subsequently, the gesture detecting unit 107 refers to the gesture determination conditions indicating a correspondence between the shape of the hand and the RMS for each of the channels. Thus, the gesture detecting unit 107 detects the shape of the hand corresponding to the calculated RMSs for the plurality of channels. For example, the gesture detecting unit 107 detects the gesture "rock" as the shape of the hand corresponding to the RMSs for the plurality of channels illustrated in FIG. 13.

<Step S105>

The output unit 109 outputs a control command to the control unit 1002 on the basis of the result of detection output from the gesture detecting unit 107. That is, the output unit 109 outputs the control command on the basis of the rotational direction of the rotational movement of the wrist and the shape of the hand. For example, if a rotational movement of the wrist is detected, the output unit 109 outputs a control command for switching a screen to another screen displayed on the display unit 1003 on the basis of the combination of the rotational direction and the shape of the hand.

An example of a control command based on the result of gesture detection is described below with reference to FIGS. 15 and 16.

Figure 15:
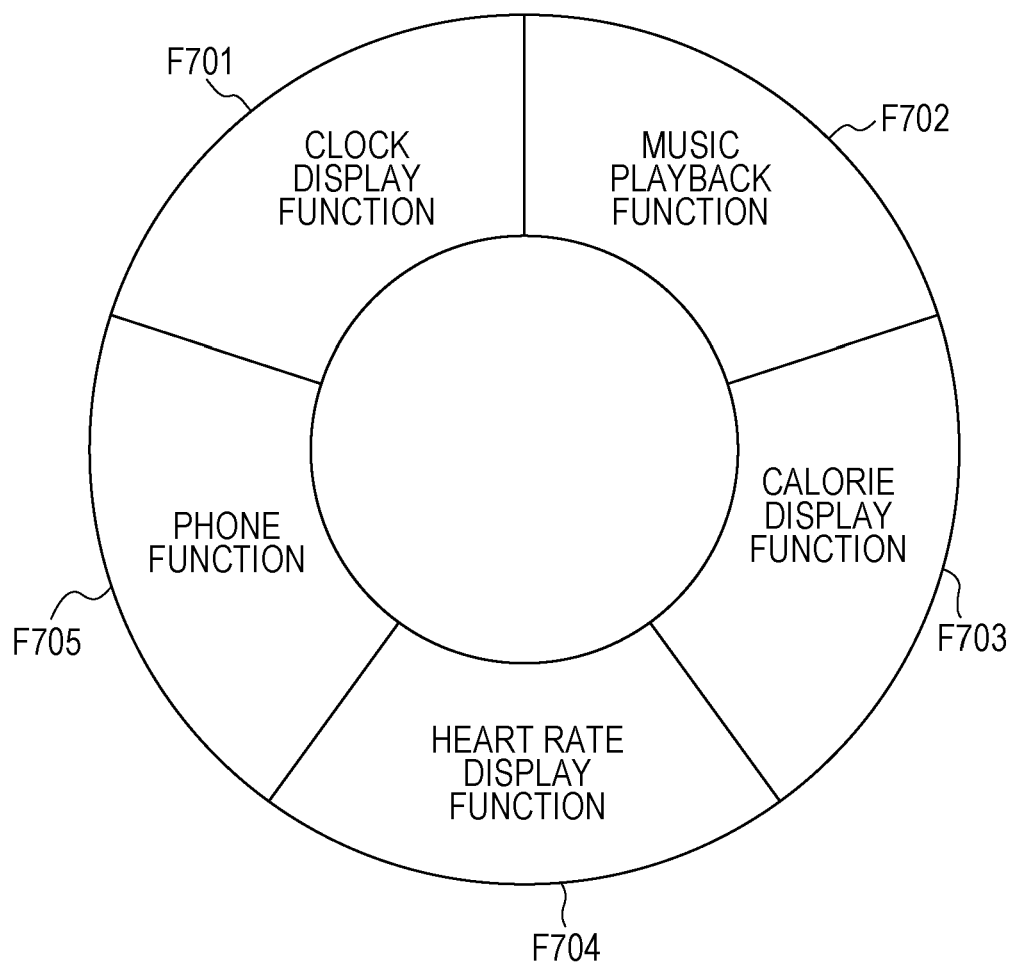
FIG. 15 illustrates the functions of the information terminal according to the first exemplary embodiment.
Figure 16:
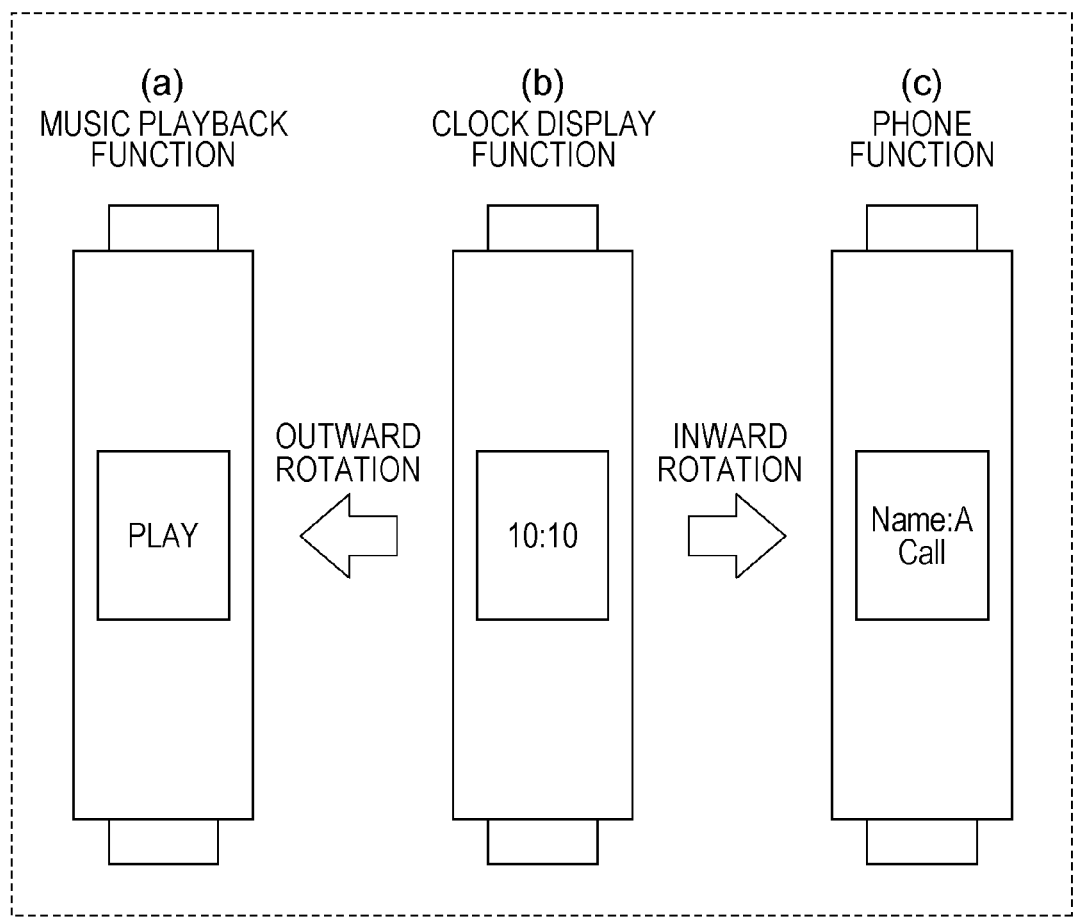
FIG. 16 illustrates an example of switching between screens displayed on a display unit of the information terminal according to the first exemplary embodiment.

FIG. 15 illustrates the functions of the information terminal 1000 according to the first exemplary embodiment. FIG. 16 illustrates an example of switching between screens displayed on the display unit 1003 of the information terminal 1000 according to the first exemplary embodiment.

As illustrated in FIG. 15, the information terminal 1000 includes, for example, a clock display function F701, a music playback function F702, a calorie display function F703, a heart rate display function F704, and a phone function F705. Each of the functions has its own screen corresponding thereto. In this example, the display unit 1003 can display only one screen for each of the functions at a time. Accordingly, to switch a current screen to a screen of a desired function, the user performs a gesture.

For example, if a gesture where the hand forms the shape indicating a "rock" and the wrist rotates outward is acquired as the result of detection, the output unit 109 outputs a control command for displaying, on the display unit 1003, a screen corresponding to a function next to the current function in the clockwise direction in FIG. 15. In this manner, when, as illustrated in FIG. 16, a screen corresponding to the clock display function F701 is displayed and if the outward rotation of the wrist is detected, the screen corresponding to the clock display function F701 is switched to a screen corresponding to the music playback function F702.

In addition, if a gesture where the hand forms the shape indicating a "rock" and the wrist rotates inward is acquired as the result of detection, the output unit 109 outputs a control command for displaying, on the display unit 1003, a screen corresponding to a function next to the current function in the counterclockwise direction in FIG. 15. In this manner, when, as illustrated in FIG. 16, a screen corresponding to the clock display function F701 is displayed and if the inward rotation of the wrist is detected, the screen corresponding to the clock display function F701 is switched to a screen corresponding to the phone function F705.

At that time, if the shape of the hand is not a rock, a control command need not be output even when the outward rotation or the inward rotation is detected. That is, if the shape of the hand is a predetermined shape, the output unit 109 outputs a control command corresponding to the rotational direction of the wrist. However, if the shape of the hand is not a predetermined shape, the output unit 109 need not output a control command corresponding to the rotational direction of the wrist.

In this manner, if the shape of the hand is a predetermined shape, the information terminal 1000 can be controlled on the basis of the rotational direction of the rotational movement of the wrist. Accordingly, the occurrence of an unwanted operation caused by a gesture of the rotational movement of the wrist can be reduced.

<Step S106>

The control unit 1002 controls the information terminal 1000 on the basis of the control command received from the output unit 109. For example, as described above, the control unit 1002 switches a screen to another screen displayed on the display unit 1003 on the basis of the control command.

Effects

As described above, according to the input apparatus 100 of the present exemplary embodiment, a rotational movement of the wrist of the user can be detected as a gesture. A rotational movement of the wrist does not impose a heavy burden on the body of the user and is a natural movement. That is, the device to be controlled can be controlled by using a simple gesture. In addition, by using the rotational direction of the wrist, the variation of the gesture can be increased.

In addition, according to the input apparatus 100 of the present exemplary embodiment, by comparing at least one of the representative value of the muscle potentials on the wrist and the representative value of the accelerations of the wrist with the predetermined threshold value, the start point time can be detected. Accordingly, the start point time can be detected by performing a relatively simplified process and, thus, the processing load required for detecting the start point time can be reduced.

In addition, according to the input apparatus 100 of the present exemplary embodiment, if it is determined that the position of the wrist is the predetermined position, the rotational movement of the wrist and the rotational direction of the rotational movement can be detected. Accordingly, if the wrist is not located at the position at which a gesture is to be performed, detection of the gesture can be prevented. That is, when the user does not intend to perform a gesture, the probability of erroneous detection of a gesture can be reduced.

In addition, according to the input apparatus 100 of the present exemplary embodiment, the shape of the user's hand can be detected as a gesture of the user. Accordingly, the variation of a gesture can be increased.

In addition, according to the input apparatus 100 of the present exemplary embodiment, the information terminal 1000 can be controlled on the basis of a combination of the rotational direction of a rotational movement of the wrist and the shape of the hand. Accordingly, the variation of control using gestures can be increased.

First Modification of First Exemplary Embodiment

A first modification of the first exemplary embodiment is described below.

Figure 17:
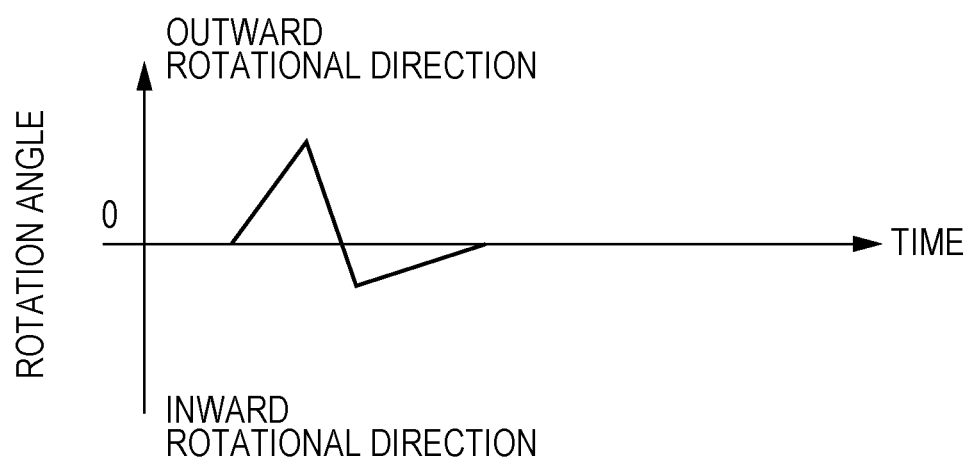
FIG. 17 is a graph illustrating an example of the rotational movement of the wrist according to a first modification of the first exemplary embodiment.

Due to the structural characteristics of the human arm and the wrist, a direction in which the user cannot rotate their wrist exists (hereinafter, the direction is referred to as a "difficult direction"). For example, as illustrated in FIG. 10A, the information terminal 1000 is worn on the wrist, the user can easily and significantly rotate outward. In contrast, it is difficult for the user to significantly rotate the wrist inward. Accordingly, to rotate the wrist inward, the user rotates the wrist outward first and, thereafter, rotates the wrist inward, as illustrated in FIG. 17. That is, to rotate the wrist in the difficult direction, the user rotates the wrist in a direction opposite to the difficult direction first and, thereafter, rotates the wrist in the difficult direction.

As used herein, the rotational movement of the wrist in a direction opposite to the difficult direction prior to the rotational movement of the wrist in the difficult direction is referred to as a "preparatory movement". The preparatory movement is also referred to as a "preceding movement".

Figure 18:
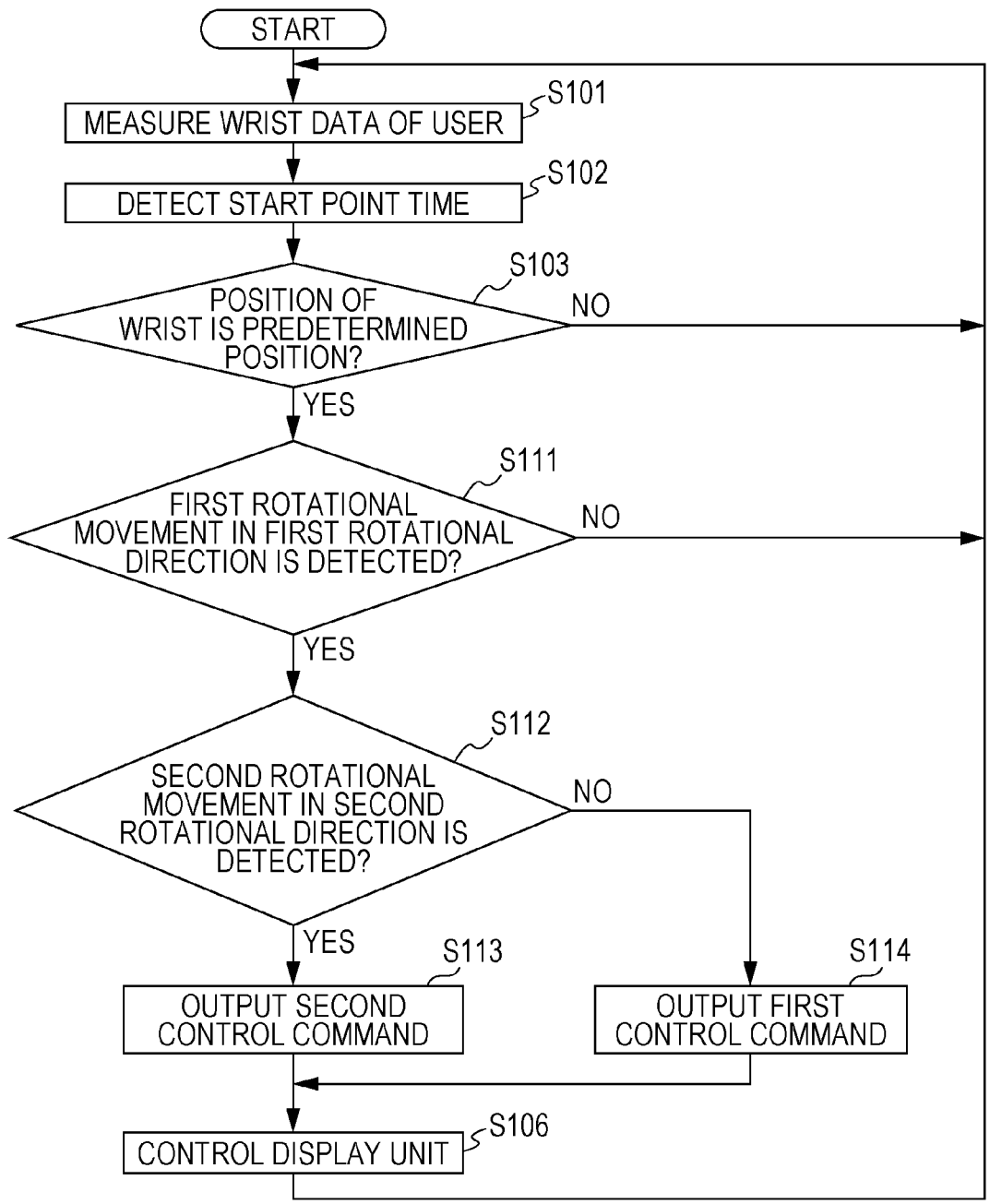
FIG. 18 is a flowchart of a gesture detection process according to the first modification of the first exemplary embodiment.

The processing performed to detect the rotation of the wrist in the difficult direction as a gesture is described below. FIG. 18 is a flowchart of a gesture detection process according to the first modification of the first exemplary embodiment. The same numbering will be used in referring to a process in FIG. 18 as is utilized above in describing FIG. 5, and description of the process is not repeated. In the following description, a first rotational direction is defined as a direction opposite to the difficult direction. In addition, a second rotational direction is defined as the difficult direction.

The gesture detecting unit 107 determines whether a first rotational movement in the first rotational direction is detected from the wrist data measured by the measuring unit 101 for a first period of time having a predetermined duration from the start point time (S111). If the first rotational movement is not detected (No in step S111), the processing returns to step S101. However, if the first rotational movement is detected (Yes in step S111), the gesture detecting unit 107 determines whether the second rotational movement in the second rotational direction is detected from the wrist data measured by the measuring unit 101 for a second period of time that follows the first period of time (S112).

If the second rotational movement is detected (Yes in step S112), the output unit 109 outputs, to the control unit 1002, the second control command corresponding to the second rotational direction (S113). However, if the second rotational movement is not detected (No in step S112), the output unit 109 outputs, to the control unit 1002, a first control command corresponding to the first rotational direction (S114).

In this manner, upon detecting the second rotational movement in the second rotational direction that follows the first rotational movement in the first rotational direction, which is opposite to the second rotational direction, (i.e., the preparatory movement of the second rotational movement in the second rotational direction), the output unit 109 outputs a second control command corresponding to the second rotational direction. That is, if the first rotational movement in the first rotational direction is detected and, thereafter, the second rotational movement in the second rotational direction is detected, the output unit 109 outputs the second control command corresponding to the second rotational direction without outputting the first control command corresponding to the first rotational direction. Conversely, even when the second rotational movement in the second rotational direction is detected, the output unit 109 does not output the second control command corresponding to the second rotational direction if the first rotational movement in the first rotational direction is not detected prior to the second rotational movement.

As described above, according to the input apparatus of the present modification, if the second rotational movement in the second rotational direction that follows the first rotational movement in the first rotational direction is detected, the second control command corresponding to the second rotational direction can be output without outputting the first control command corresponding to the first rotational direction. When the user rotates their wrist, a direction in which it is difficult for the user to rotate the wrist may exist. In such a case, the user performs a preparatory movement, that is, the user rotates the wrist in a direction opposite to the direction in which the rotation was difficult. Thereafter, the user rotates the wrist in the direction in which the rotation is difficult. Accordingly, the first rotational movement followed by the second rotational movement is detected, the first rotational movement may be the preparatory movement of the second rotational movement. At that time, if the control command is output on the basis of the first rotational movement, an operation that the user does not want (i.e., an erroneous operation) occurs. Accordingly, if the second rotational movement in the second rotational direction that follows the first rotational movement in the first rotational direction is detected, the control command corresponding to the first rotational direction is not output. In this manner, output of the control command on the basis of the preparatory movement can be prevented and, thus, an erroneous operation can be prevented.

Note that the difficult direction of rotation is changed in accordance with the state of the wrist when the rotational movement starts. More specifically, the difficult direction when the display screen of the information terminal is on the back of the hand side is opposite to the difficult direction when the display screen of the information terminal is on the palm of the hand side. For example, as illustrated in FIG. 10A, when the display screen is on the back of the hand side of the wrist of the user, the difficult direction (the second rotational direction) is the inward rotational direction of the wrist. In contrast, as illustrated in FIG. 10B, when the display screen is on the palm of the hand side, the difficult direction (the second rotational direction) is the outward rotational direction of the wrist.

Accordingly, the difficult direction may be identified on the basis of the input from the user. More specifically, when the user wears the information terminal 1000 on their wrist, the information terminal 1000 may receive the information indicating which one of the back of the hand side or the palm of the hand side the display screen is on. Note that if the side on which the display screen is located is predetermined, it is not necessary to dynamically change the difficult direction. The difficult direction may be fixed to a particular direction.

Second Exemplary Embodiment

A second exemplary embodiment is described next. According to the present exemplary embodiment, it is determined whether the user is viewing the display screen in addition to detection of a gesture. The result of determination is output to the control unit together with the result of detection of a gesture. The difference between the second exemplary embodiment and the first exemplary embodiment is mainly described in detail below with reference to the accompanying drawings.

Configuration of Information Terminal

Figure 19:
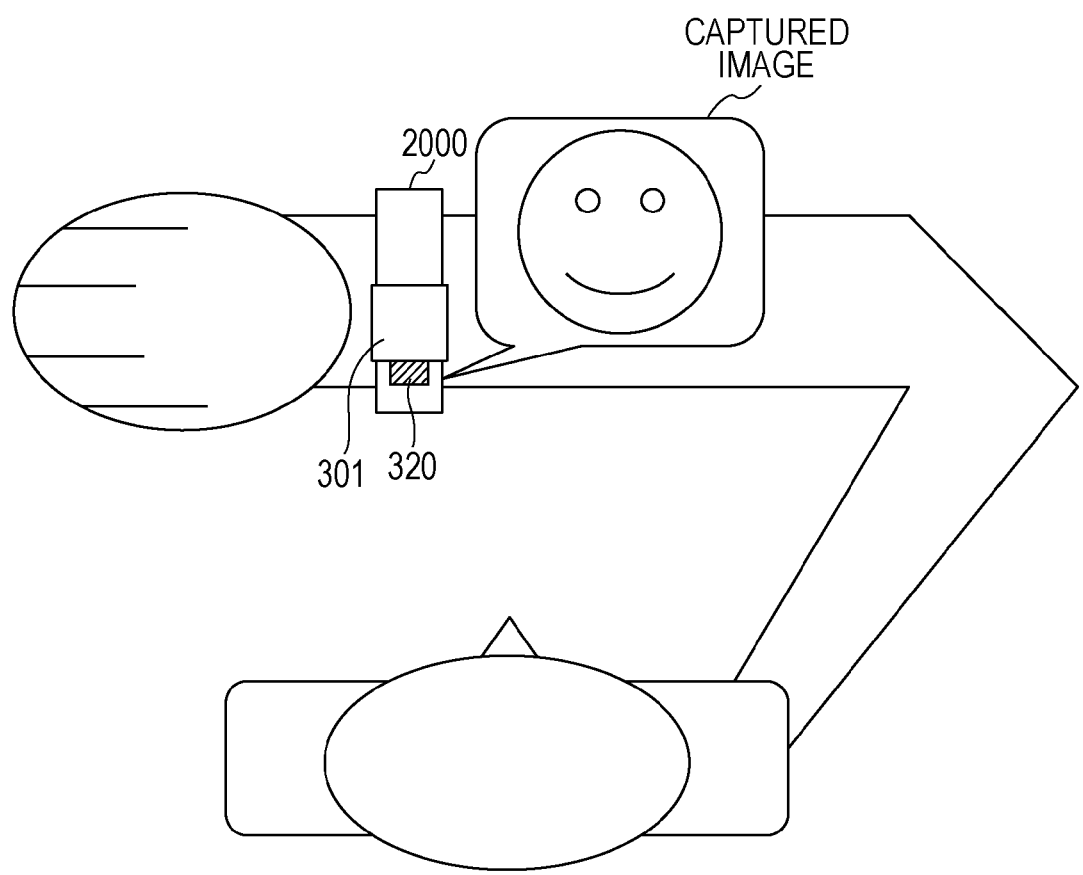
FIG. 19 illustrates an information terminal worn on the wrist of the user according to a second exemplary embodiment.

FIG. 19 illustrates an information terminal 2000 worn on the wrist of a user according to the second exemplary embodiment. The information terminal 2000 includes a camera 320.

The camera 320 is disposed in the vicinity of the main body 301. The camera 320 captures the image of a space above the display screen provided in the main body 301. That is, the camera 320 captures the image of the face of the user if the user is viewing the display screen. For example, as illustrated in FIG. 19, when the user views the display screen, the image captured by the camera 320 contains the face of the user. In contrast, as illustrated in FIG. 10C, when the user is not viewing the display screen, the image captured by the camera 320 does not contain the face of the user.

Figure 20:
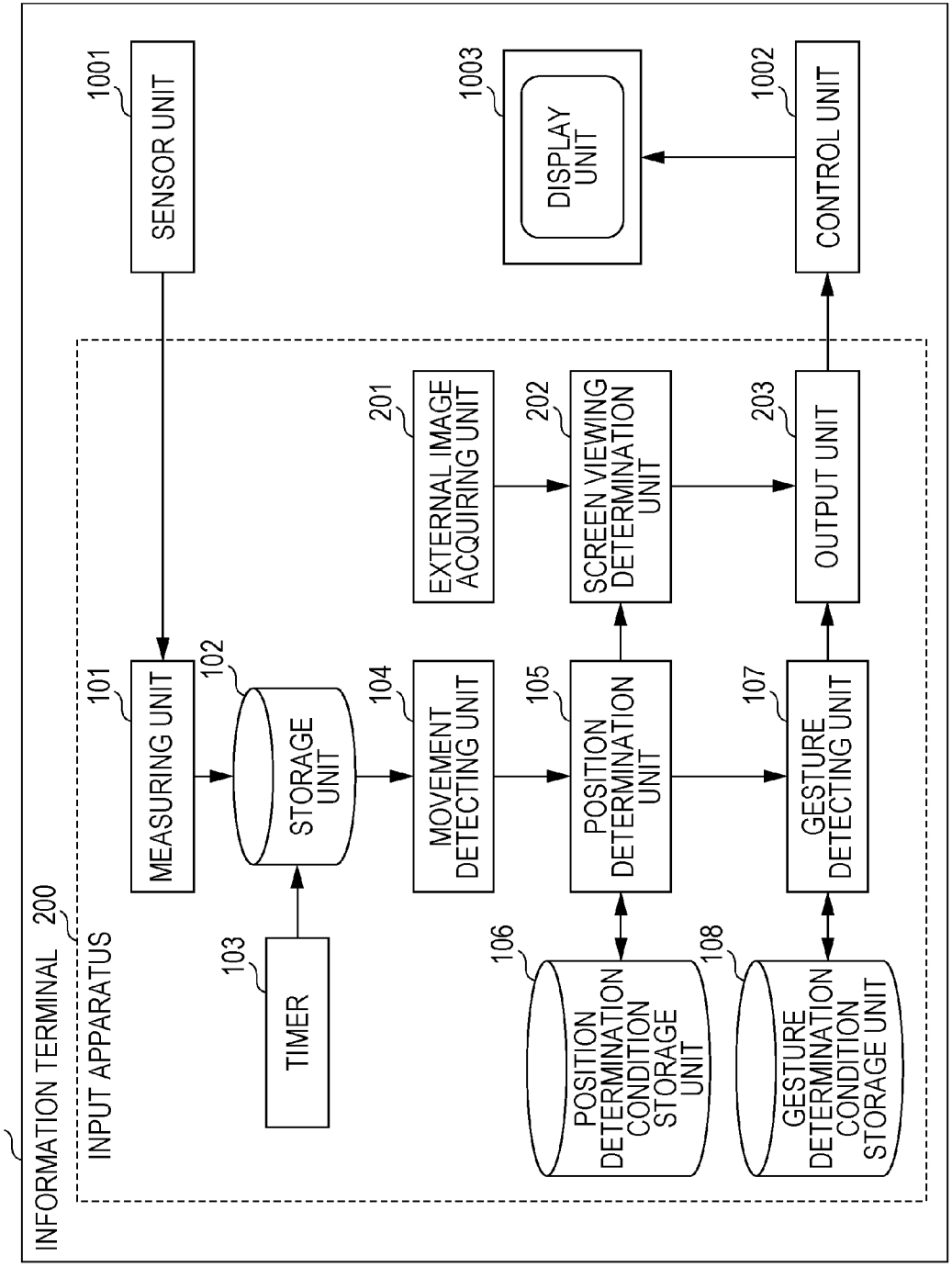
FIG. 20 is a block diagram of the functional configuration of the information terminal according to the second exemplary embodiment.

FIG. 20 is a block diagram of the functional configuration of the information terminal 2000 according to the second exemplary embodiment. In FIG. 20, the same numbering is used to indicate elements which are the same as or similar to the elements in FIG. 4. Description of each of the elements is not repeated as appropriate.

As illustrated in FIG. 20, the information terminal 2000 includes an input apparatus 200, the sensor unit 1001, the control unit 1002, and the display unit 1003. The input apparatus 200 includes the measuring unit 101, the storage unit 102, the timer 103, the movement detecting unit 104, the position determination unit 105, the position determination condition storage unit 106, the gesture detecting unit 107, the gesture determination condition storage unit 108, an external image acquiring unit 201, a screen viewing determination unit 202, and an output unit 203.

The external image acquiring unit 201 acquires the image of a space above the display screen captured using the camera 320 at the start point time.

The screen viewing determination unit 202 determines whether the user is viewing the display screen. More specifically, the screen viewing determination unit 202 determines whether the user is viewing the display screen on the basis of, for example, the image acquired by the external image acquiring unit 201. Still more specifically, the screen viewing determination unit 202 determines whether the user is viewing the display screen by determining whether the face is detected from the image.

The output unit 203 outputs a control command on the basis of the result of detection output from the gesture detecting unit 13 and the result of determination output from the screen viewing determination unit 202.

Processing Performed by Information Terminal

Figure 21:
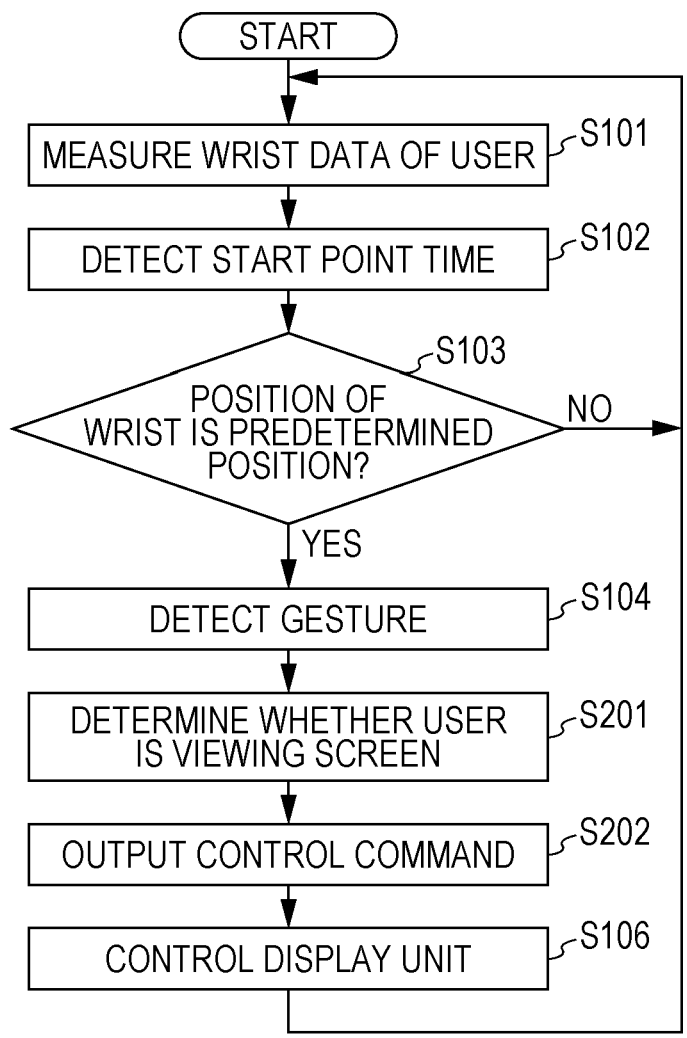
FIG. 21 is a flowchart of the processing performed by the information terminal according to the second exemplary embodiment.

The processing performed by the information terminal 2000 having the above-described configuration is described below. FIG. 21 is a flowchart of the processing performed by the information terminal 2000 according to the second exemplary embodiment. In FIG. 21, the same numbering is used to indicate steps which are the same as or similar to the steps in FIG. 5. Description of each of the steps is not repeated as appropriate.

After a gesture is detected (S104), the screen viewing determination unit 202 determines whether the user is viewing the display screen using an image acquired from the external image acquiring unit 201 (S201). More specifically, the external image acquiring unit 201 captures an image using the camera 320 at the start point time and sends the captured image to the screen viewing determination unit 202. The screen viewing determination unit 202 performs face detection on the image received from the external image acquiring unit 201. For example, to perform face detection, the screen viewing determination unit 202 calculates the feature on the basis of the luminance values of the image received from the external image acquiring unit 201 and compares the feature with the feature of each of pre-registered face images. If the similarity between the features is higher than or equal to a predetermined value, the screen viewing determination unit 202 determines that the face image is detected. If a face is detected in the image, the screen viewing determination unit 202 determines that the user is viewing the display screen. However, if no face is detected in the image, the screen viewing determination unit 202 determines that the user is not viewing the display screen.

The output unit 203 outputs, to the control unit 1002, a control command on the basis of the result of detection of a gesture and the result of determination as to whether the user is viewing the display screen (S202). More specifically, the output unit 203 selects a control command corresponding to the gesture, for example, in accordance with whether the user is viewing the display screen.

For example, in FIG. 16(a) in which a music playback screen is displayed, if the result of determination indicating that the user is viewing the display screen and the result of detection indicating the rotational movement of the wrist and the rotational direction are received, the output unit 203 outputs the control command to switch the screen to another screen, as described in the first exemplary embodiment.

In contrast, if the result of determination indicating that the user is not viewing the display screen and the result of detection indicating the rotational movement of the wrist and the rotational direction are received, the output unit 203 outputs a control command for changing the currently played-back music or changing the volume of the music. Thereafter, the control unit 1002 controls the information terminal 2000 in accordance with a control command output from the output unit 203 (S203).

Effects

As described above, according to the present exemplary embodiment, the input apparatus 200 can output a control command on the basis of the result of determination as to whether the user is viewing the display screen. Accordingly, the control command for a gesture can be changed in accordance with the result of determination. In addition, it can be determined whether the control command for a gesture is output in accordance with the result of determination. That is, the variation of control using gestures can be increased.

Third Exemplary Embodiment

A third exemplary embodiment is described below. According to the present exemplary embodiment, the input apparatus worn on the wrist of a user controls a device to be controlled disposed away from the input apparatus.

Configuration of Input Apparatus

Figure 22:
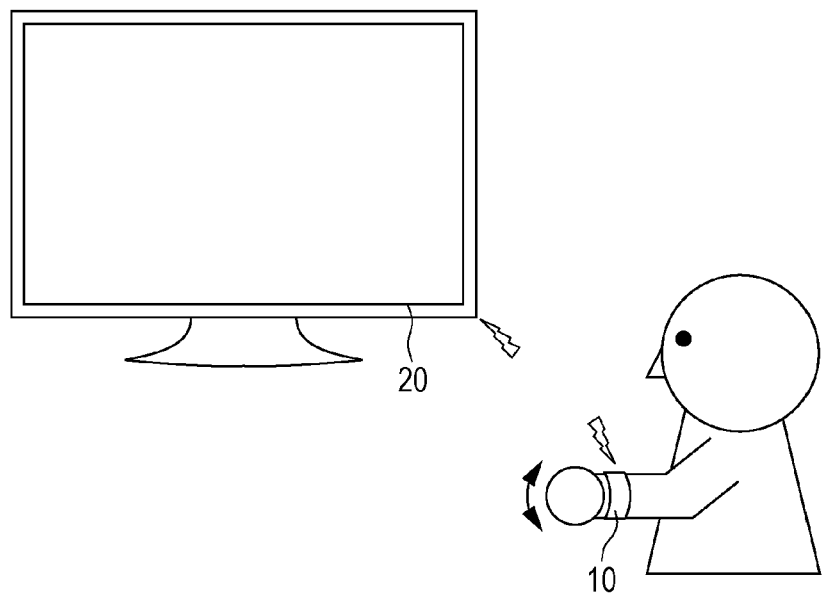
FIG. 22 illustrates an example of usage of an input apparatus according to a third exemplary embodiment.

FIG. 22 illustrates an example of usage of an input apparatus 10 according to the third exemplary embodiment.

The input apparatus 10 is worn on the wrist of the user and outputs a control command to the device to be controlled 20 on the basis of the result of detection of a gesture.

The device to be controlled 20 receives a control command from the input apparatus 10 and controls a variety of functions in accordance with the received control command. In FIG. 22, the device to be controlled 20 is a television receiver. Note that the device to be controlled 20 is not limited to a television receiver. Examples of the device to be controlled 20 include a digital video recorder, a disk player, a set-top box, a laundry machine, and an air conditioner.

Figure 23:
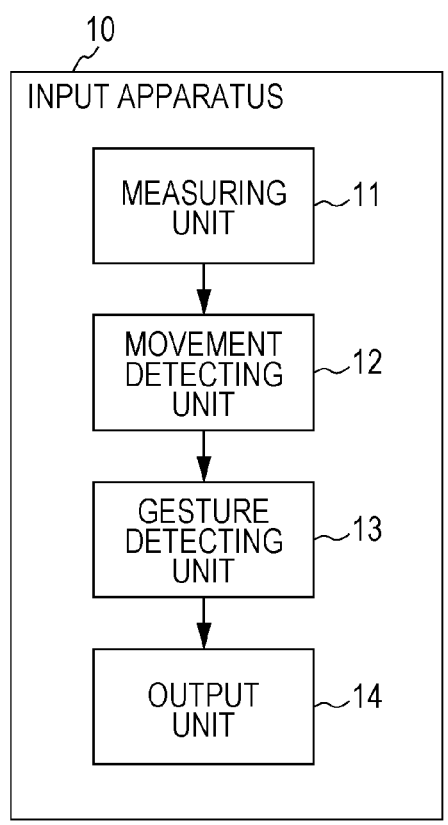
FIG. 23 is a block diagram of the functional configuration of the input apparatus according to the third exemplary embodiment.

FIG. 23 is a block diagram of the functional configuration of the input apparatus 10 according to the third exemplary embodiment. The input apparatus 10 includes a measuring unit 11, a movement detecting unit 12, a gesture detecting unit 13, and an output unit 14.

The measuring unit 11 measures time-series wrist data indicating the movement of the wrist of the user using a sensor secured on the wrist of the user. More specifically, the measuring unit 11 measures at least one of the muscle potential on the wrist of the user and the acceleration of the wrist of the user as the wrist data.

The movement detecting unit 12 detects the point in time at which the movement of the wrist of the user is about to start using the wrist data measured by the measuring unit 11 (a start point time). That is, the movement detecting unit 12 detects the start point time by comparing a value indicating the magnitude of the movement of the wrist of the user indicated by the wrist data with a threshold value.

The gesture detecting unit 13 detects, as a gesture of the user, the rotational movement of the wrist about the lower arm of the user from the wrist data measured by the measuring unit 11 for a predetermined period of time from the start point time. That is, the gesture detecting unit 13 recognizes a gesture from the wrist data.

As used herein, the term "gesture" refers to an intentional movement of the user to control the device to be controlled 20. According to the present exemplary embodiment, the rotational movement of the wrist and the rotational direction are used as a gesture for controlling the device to be controlled 20.

The predetermined period of time is set on the basis of a period of time from the start of a gesture performed by the user to the end of the gesture. That is, the predetermined period of time is set on the basis of a period of time required for the user to rotate their wrist. The period of time from the time the user starts a gesture to the time the user ends the gesture can be obtained experimentally or empirically.

The output unit 14 outputs a control command on the basis of the result of detection output by the gesture detecting unit 13. More specifically, if the rotational movement of the wrist and the rotational direction are detected, the output unit 14 sends a control command corresponding to the rotational movement of the wrist and the rotational direction to the device to be controlled 20.

The device to be controlled 20 performs the operation in accordance with the control command. For example, if the rotational direction of the wrist is the first rotational direction, the device to be controlled 20 increases the volume level in accordance with the control command output from the output unit 14. However, if the rotational direction of the wrist is the second rotational direction, the device to be controlled 20 decreases the volume level in accordance with the control command output from the output unit 14.

Note that the operation corresponding to the rotational direction of the wrist is not limited to an operation to change the volume level. For example, the operation corresponding to the rotational direction of the wrist may be performed to change a channel, turn on/off the power, or switch between input channels.

Processing Performed by Input Apparatus

Figure 24:
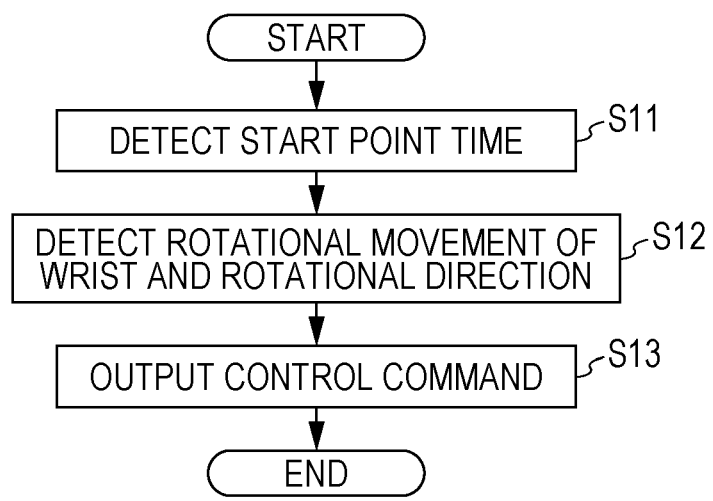
FIG. 24 is a flowchart of the processing performed by the input apparatus according to the third exemplary embodiment.

The processing performed by the input apparatus 10 having the above-described configuration is described below. FIG. 24 is a flowchart of the processing performed by the input apparatus 10 according to the third exemplary embodiment. In FIG. 24, the wrist data are measured at a predetermined sampling rate.

The movement detecting unit 12 detects the start point time at which the movement of the wrist of the user is about to start using the wrist data measured by the measuring unit 11 (S11). For example, when a value indicating the magnitude of the movement of the wrist indicated by wrist data exceeds a threshold value, the movement detecting unit 12 detects, as the start point time, the point in time at which the wrist data is measured.

Subsequently, the gesture detecting unit 13 detects, as a gesture of the user, the rotational movement of the wrist about the lower arm of the user from the wrist data measured by the measuring unit 11 for a predetermined period of time from the start point time (S12). More specifically, the gesture detecting unit 13 refers to prestored two patterns of the wrist data corresponding to two rotational directions (hereinafter referred to as "wrist patterns") on the basis of the wrist data measured by the measuring unit 11. At that time, if the wrist pattern that is the same as the wrist data measured by the measuring unit 11 is present, the gesture detecting unit 13 detects the rotational movement of the wrist in the rotational direction corresponding to the wrist pattern as a gesture of the user.

Finally, the output unit 14 outputs a control command corresponding to the result of detection performed by the gesture detecting unit 13 (S13). More specifically, for example, if the gesture detecting unit 13 detects a gesture of the user, the output unit 14 sends, to the device to be controlled 20, a control command corresponding to the gesture.

Effects

As described above, according to the present exemplary embodiment, the input apparatus 10 can output a control command on the basis of the rotational movement of the wrist of the user. A rotational movement of the wrist does not impose a heavy burden on the body of the user and is a natural movement. That is, the device to be controlled can be controlled by using a simple gesture. In addition, by detecting the rotational direction of the wrist as a gesture, the variation of the gesture can be increased.

Fourth Exemplary Embodiment

A fourth exemplary embodiment is described below. According to the present exemplary embodiment, it is determined whether the state of the wrist of the user is a state in which the inward rotation or the outward rotation of the wrist is difficult when a gesture is started. The difference between the fourth exemplary embodiment and the first exemplary embodiment and the difference between the fourth exemplary embodiment and the first modification of the first exemplary embodiment are mainly described in detail below with reference to the accompanying drawings.

Configuration of Information Terminal

Figure 25:
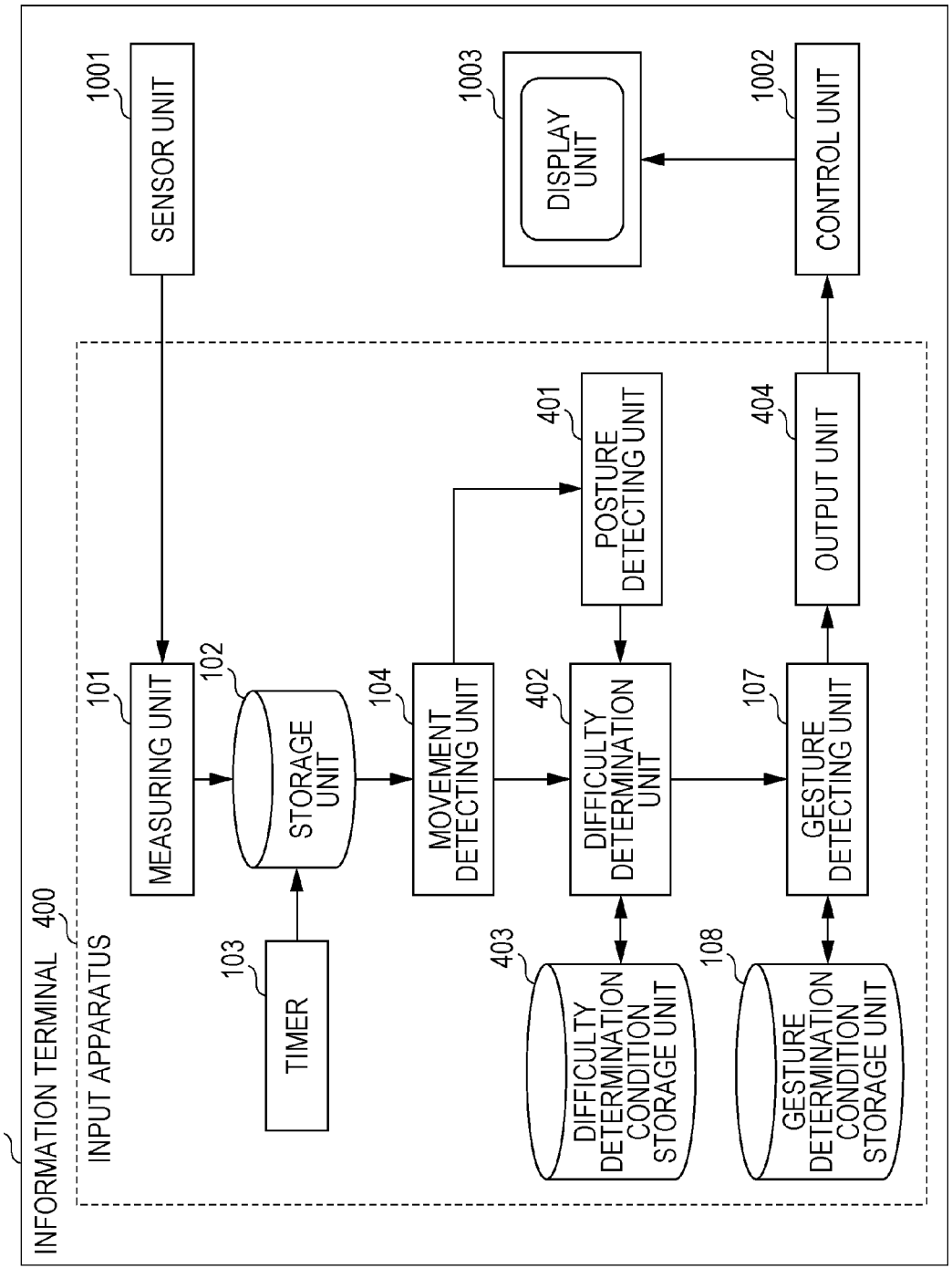
FIG. 25 is a block diagram of the functional configuration of an information terminal according to a fourth exemplary embodiment.

FIG. 25 is a block diagram of the functional configuration of an information terminal 4000 according to the fourth exemplary embodiment. In FIG. 25, the same numbering is used to indicate elements which are the same as or similar to the elements in FIG. 4. Description of each of the elements is not repeated as appropriate.

As illustrated in FIG. 25, the information terminal 4000 includes an input apparatus 400, the sensor unit 1001, the control unit 1002, and the display unit 1003. The input apparatus 400 includes the measuring unit 101, the storage unit 102, the timer 103, the movement detecting unit 104, a posture detecting unit 401, a difficulty determination unit 402, a difficulty determination condition storage unit 403, the gesture detecting unit 107, the gesture determination condition storage unit 108, and an output unit 404.

The posture detecting unit 401 detects the posture of the input apparatus 400 at the start point time detected by the movement detecting unit 104. For example, the posture detecting unit 401 detects the information indicating the angle formed by the normal direction of the display screen and the vertical direction (i.e., the direction of gravity). More specifically, the posture detecting unit 401 detects the acceleration of gravity in each of the x-axis, y-axis, and z-axis directions measured by, for example, the measuring unit 101.

FIG. 26 illustrates an example of a relationship between the angle formed by the normal direction of the display screen and the vertical direction and the acceleration of gravity in each of the x-axis, y-axis, and z-axis directions. As illustrated in FIG. 26, if, for example, the angle formed by the normal direction of the display screen and the vertical direction is −90 degrees, the acceleration of gravity in each of the x-axis direction and z-axis direction is "0". The acceleration of gravity in the y-axis direction is "−G". In addition, if the angle formed by the normal direction of the display screen and the vertical direction is 30 degrees, the accelerations of gravity in the x-axis, y-axis, and z-axis directions are "0", "+G/2", and "−sqrt(3)G/2", respectively.

If the first rotational movement in the first rotational direction is detected, the difficulty determination unit 402 determines whether the state of the wrist of the user is a state in which the second rotational movement in the second rotational direction is difficult (hereinafter simply referred to as a "difficult state") when the first rotational movement starts. More specifically, the difficulty determination unit 402 determines whether the state of the wrist of the user is a difficult state by determining whether the posture of the input apparatus 400 detected by the posture detecting unit 401 satisfies a difficulty determination condition.

The difficulty determination condition storage unit 403 stores the difficulty determination condition, which is a condition of the posture of the input apparatus 400 corresponding to the difficult state. According to the present exemplary embodiment, the difficulty determination condition storage unit 403 stores the range of the acceleration of gravity in each of the x-axis, y-axis, and z-axis directions as the difficulty determination condition. FIG. 27 illustrates an example of the difficulty determination condition according to the fourth exemplary embodiment. More specifically, FIG. 27 illustrates the difficulty determination condition used when the information terminal 4000 is worn on the right wrist of the user on the back of the hand side.

In FIG. 27, the difficulty determination condition indicates that the state of the wrist of the user is a difficult state if (a) the acceleration of gravity in the x-axis direction is "0", (b) the acceleration of gravity in the y-axis direction is higher than or equal to "−G" and lower than or equal to "+G/2", and (c) the acceleration of gravity in the z-axis direction is higher than or equal to "−G" and lower than or equal to 0.

The difficulty determination condition corresponds to the range of the angle formed by the normal direction of the display screen and the vertical direction from −90 degrees to 30 degrees illustrated in FIG. 26. If the angle formed by the normal direction of the display screen and the vertical direction is greater than −90 degrees and less than 30 degrees, the right wrist of the user has already been twisted inward. Accordingly, it is difficult for the user to further rotate the right wrist in the inward direction. Thus, if the user wants to further rotate the right wrist in the inward direction, the user rotates the right wrist in the outward direction and, thereafter, rotates the right wrist in the inward direction. That is, prior to the second rotational movement (the inward rotation in this example) in the second rotational direction (i.e., the difficult direction in this example), the first rotational movement in the first rotational direction (the outward rotation in this example) is performed as the preparatory movement.

Operation Performed by Information Terminal

The processing performed by the information terminal 4000 having the above-described configuration is described below.

Figure 28:
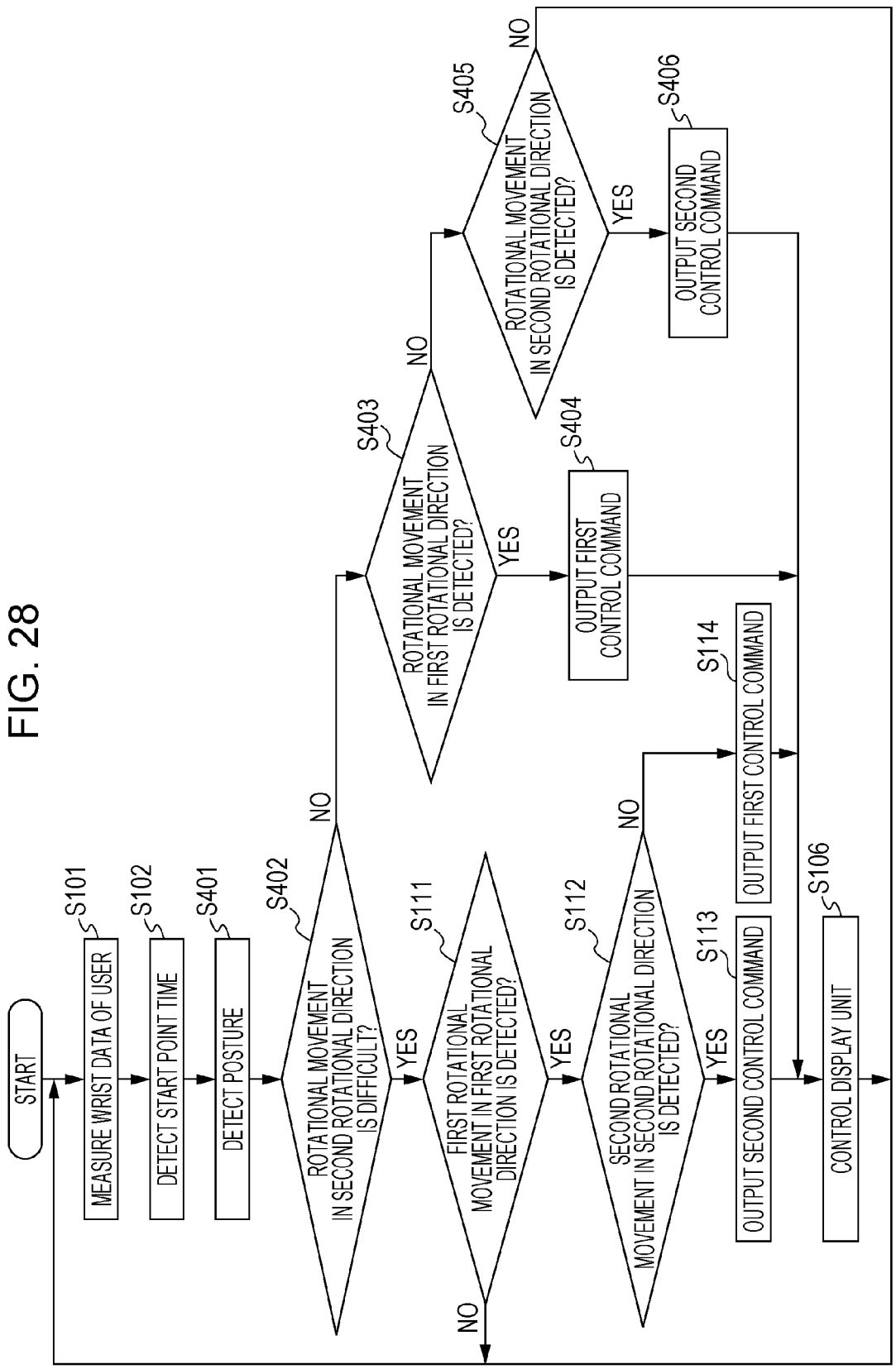
FIG. 28 is a flowchart of the processing performed by the information terminal according to the fourth exemplary embodiment.

FIG. 28 is a flowchart of the processing performed by the information terminal 4000 according to the fourth exemplary embodiment. The same numbering will be used in referring to a process in FIG. 28 as is utilized above in describing FIG. 5 or 18, and description of the process is not repeated. In the following description, a first rotational direction is defined as a direction opposite to the difficult direction. In addition, a second rotational direction is defined as the difficult direction.

The posture detecting unit 401 detects the posture of the input apparatus 400 (the posture of the information terminal 4000 in this example) (S401). For example, the posture detecting unit 401 detects the acceleration of gravity in each of the x-axis, y-axis, and z-axis directions of the input apparatus 400.

Subsequently, the difficulty determination unit 402 determines whether the rotational movement in the second rotational direction is difficult (S402). That is, the difficulty determination unit 402 determines whether the state of the wrist of the user is a difficult state. More specifically, the difficulty determination unit 402 determines whether the posture detected by the posture detecting unit 401 satisfies the difficulty determination condition. For example, if the accelerations of gravity in the x-axis, y-axis, and z-axis directions are (0, 0, −G), the difficulty determination unit 402 refers to the difficulty determination condition illustrated in FIG. 27 and determines that the rotational movement in the second rotational direction is difficult.

At that time, if it is determined that the rotational movement in the second rotational direction is difficult (Yes in S402), the gesture detecting unit 107 determines whether the first rotational movement in the first rotational direction is detected from the wrist data measured by the measuring unit 101 for the first period of time having a predetermined duration from the start point time (S111). If the first rotational movement is not detected (No in S111), the processing returns to step S101. However, if the first rotational movement is detected (Yes in S111), the gesture detecting unit 107 determines whether the second rotational movement in the second rotational direction is detected in the wrist data measured by the measuring unit 101 for the second period of time that follows the first period of time (S112). If the second rotational movement is detected (Yes in step S112), the output unit 404 outputs a second control command corresponding to the second rotational direction to the control unit 1002 (S113). However, if the second rotational movement is not detected (No in step S112), the output unit 404 outputs a first control command corresponding to the first rotational direction (S114).

However, if it is determined that the rotational movement in the second rotational direction is not difficult (No in S402), the gesture detecting unit 107 determines whether the first rotational movement in the first rotational direction is detected from the wrist data measured by the measuring unit 101 for the first period of time having a predetermined duration from the start point time (S403).

If the first rotational movement is detected (Yes in S403), the output unit 404 outputs the first control command corresponding to the first rotational direction (S404). However, if the first rotational movement is not detected (No in S403), it is determined whether the second rotational movement in the second rotational direction is detected from the wrist data measured by the measuring unit 101 for the first period of time having a predetermined duration from the start point time (S405).

If the second rotational movement is detected (Yes in S405), the output unit 404 outputs the second control command corresponding to the second rotational direction (S406). However, if the second rotational movement is not detected (No in S405), the processing returns to step S101.

Effect

As described above, according to the present exemplary embodiment, when the first rotational movement starts, the input apparatus 400 can determine whether the state of the wrist of the user is a state in which the second rotational movement is difficult. Accordingly, it can be determined that the preparatory movement is highly likely to be performed. As a result, if the preparatory movement is highly likely to be performed, output of the control command caused by the preparatory movement (the first rotational movement) can be prevented. As a result, an erroneous operation caused by the preparatory movement can be prevented. That is, the accuracy of recognition of a gesture can be increased.

In addition, according to the present exemplary embodiment, the input apparatus 400 can determine whether the state of the wrist of the user is a state in which the second rotational movement is difficult using the posture of the input apparatus 400. Accordingly, the accuracy of determination of the state of the wrist of the user can be increased.

Fifth Exemplary Embodiment

A fifth exemplary embodiment is described below. According to the present exemplary embodiment, it is determined whether the first rotational movement performed prior to the second rotational movement is the preparatory movement of the second rotational movement. In addition, if it is determined that the first rotational movement is the preparatory movement, the information indicating the preparatory movement is displayed for the user. The difference between the fifth exemplary embodiment and the first exemplary embodiment and the difference between the fifth exemplary embodiment and the first modification of the first exemplary embodiment are mainly described in detail below with reference to the accompanying drawings.

Configuration of Information Terminal

Figure 29:
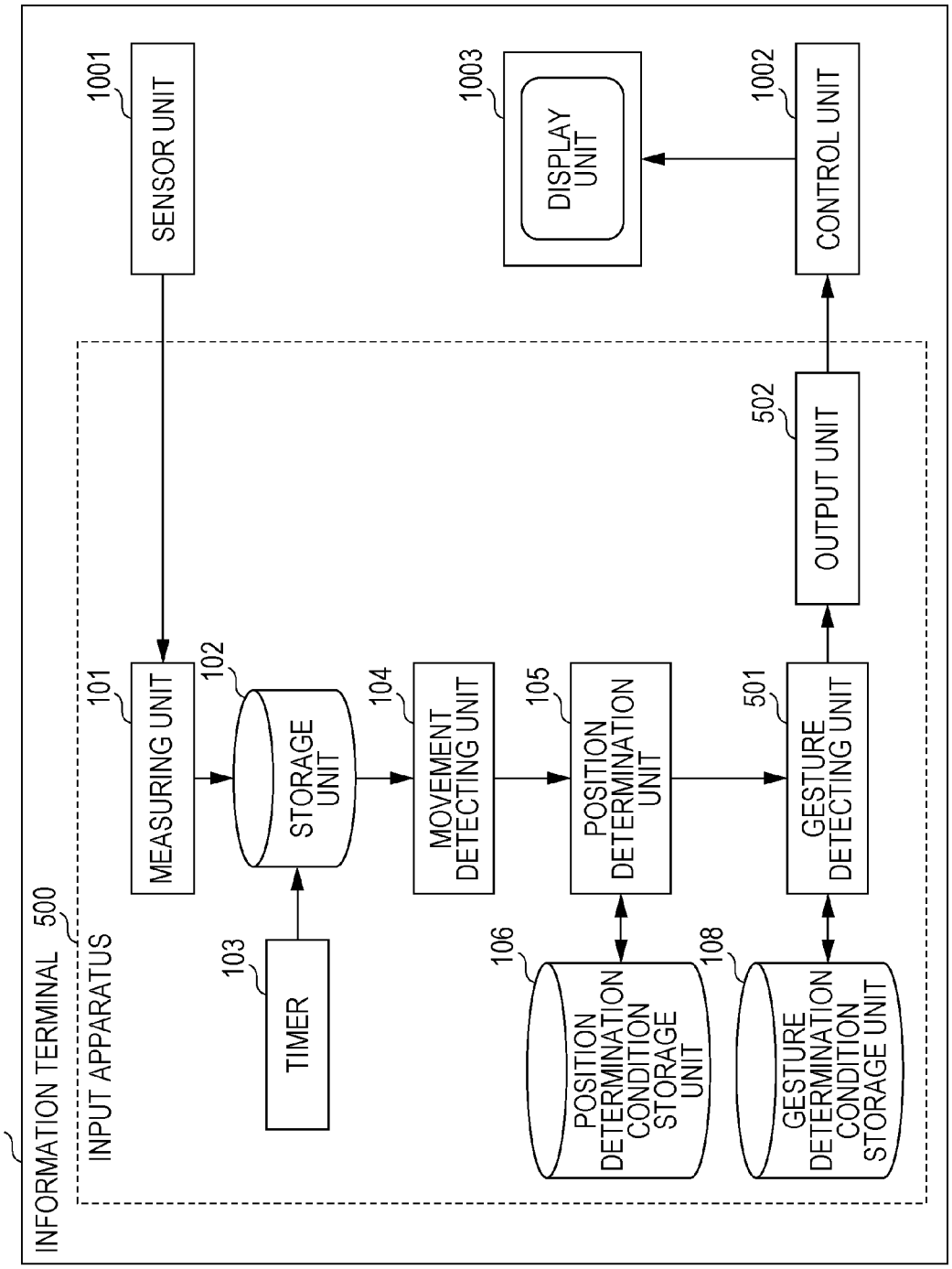
FIG. 29 is a block diagram of the functional configuration of an information terminal according to a fifth exemplary embodiment.

FIG. 29 is a block diagram of the functional configuration of an information terminal 5000 according to the fifth exemplary embodiment. In FIG. 29, the same numbering is used to indicate elements which are the same or similar to the elements in FIG. 4. Description of each of the elements is not repeated as appropriate.

As illustrated in FIG. 29, the information terminal 5000 includes an input apparatus 500, the sensor unit 1001, the control unit 1002, and the display unit 1003. The input apparatus 500 includes the measuring unit 101, the storage unit 102, the timer 103, the movement detecting unit 104, the position determination unit 105, the position determination condition storage unit 106, a gesture detecting unit 501, the gesture determination condition storage unit 108, and an output unit 502.

The gesture detecting unit 501 detects the rotational speed or the rotation angle at short time intervals (e.g., 0.1-second intervals). For example, if the sensor unit 1001 includes a gyro sensor, the measuring unit 101 measures the angular speed of the wrist in the rotational direction. The gesture detecting unit 501 calculates the rotational speed or the rotation angle on the basis of the result of measurement output from the measuring unit 101.

If the first rotational movement in the first rotational direction is detected, the output unit 502 determines whether the first rotational movement satisfies a predetermined condition. The predetermined condition is a condition used for determining the preparatory movement. That is, the output unit 502 determines whether the first rotational movement is the preparatory movement.

More specifically, the predetermined condition is that, for example, the rotational speed of the first rotational movement is lower than a threshold speed value. The threshold speed value can be predetermined experimentally or empirically. Alternatively, the predetermined condition may be that, for example, the rotation angle of the first rotational movement is less than a threshold angle value. The threshold angle value can be predetermined experimentally or empirically.

Alternatively, the predetermined condition may be defined by using both the rotational speed and the rotation angle. That is, the predetermined condition may be that the rotational speed of the first rotational movement is lower than the threshold speed value and the rotation angle of the first rotational movement is less than threshold angle value.

At that time, if it is determined that the first rotational movement satisfies the predetermined condition (i.e., if it is determined that the first rotational movement is the preparatory movement), the output unit 502 outputs, to the control unit 1002, a control command for displaying the information indicating that the first control command caused by the first rotational movement is not output on the display screen. For example, the output unit 502 outputs, to the control unit 1002, a control command for displaying the information indicating that the movement is the preparatory movement on the display screen (hereinafter, the command is referred to as a "preparatory movement display command").

In addition, when it is determined that the first rotational movement satisfies the predetermined condition and if the second rotational movement in the second rotational direction that follows the first rotational movement is detected, the output unit 502 outputs the second control command corresponding to the second rotational direction without outputting the first control command corresponding to the first rotational direction. However, if it is determined that the first rotational movement does not satisfy the predetermined condition (i.e., it is determined that the first rotational movement is not the preparatory movement) and if the second rotational movement in the second rotational direction that follows the first rotational movement is detected, the output unit 502 outputs the first control command corresponding to the first rotational direction and, thereafter, outputs the second control command corresponding to the second rotational direction.

Operation Performed by Information Terminal

Figure 30:
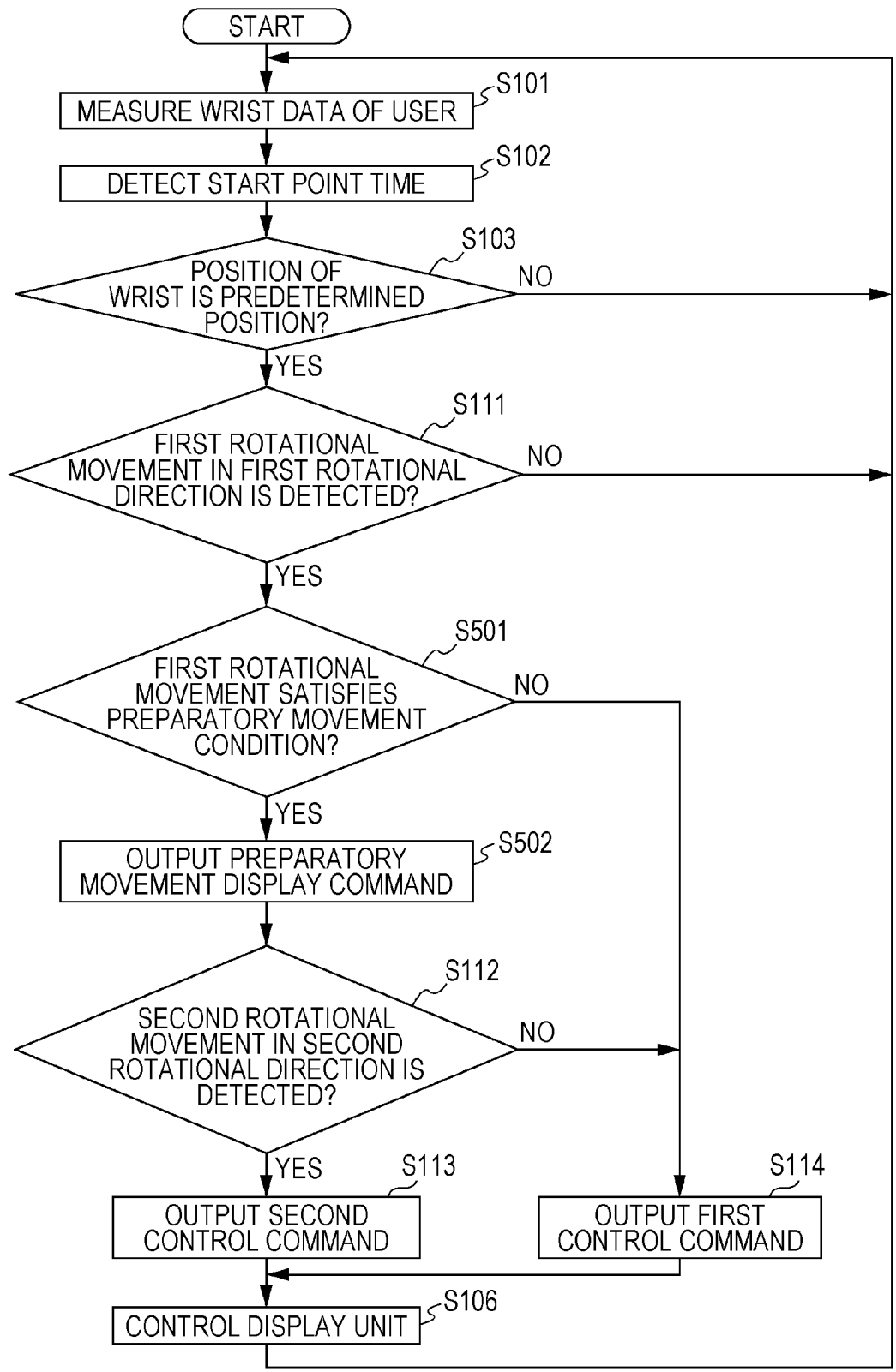
FIG. 30 is a flowchart of the processing performed by the information terminal according to the fifth exemplary embodiment.

The processing performed by the information terminal 5000 having the above-described configuration is described below. FIG. 30 is a flowchart of the processing performed by the information terminal 5000 according to the fifth exemplary embodiment. The same numbering will be used in referring to a process in FIG. 30 as is utilized above in describing FIG. 5 or 18, and description of the process is not repeated. In the following description, a first rotational direction is defined as a direction opposite to the difficult direction. In addition, a second rotational direction is defined as the difficult direction.

If the first rotational movement is detected (Yes in S111), the output unit 502 determines whether the first rotational movement satisfies a predetermined condition (S501). If it is determined that the first rotational movement satisfies the predetermined condition (Yes in S501), the output unit 502 outputs the preparatory movement display command to the control unit 1002 (S502). However, if it is determined that the first rotational movement does not satisfy the predetermined condition (No in S501), the output unit 502 outputs the first control command corresponding to the first rotational direction to the control unit 1002 (S114).

Figure 31:
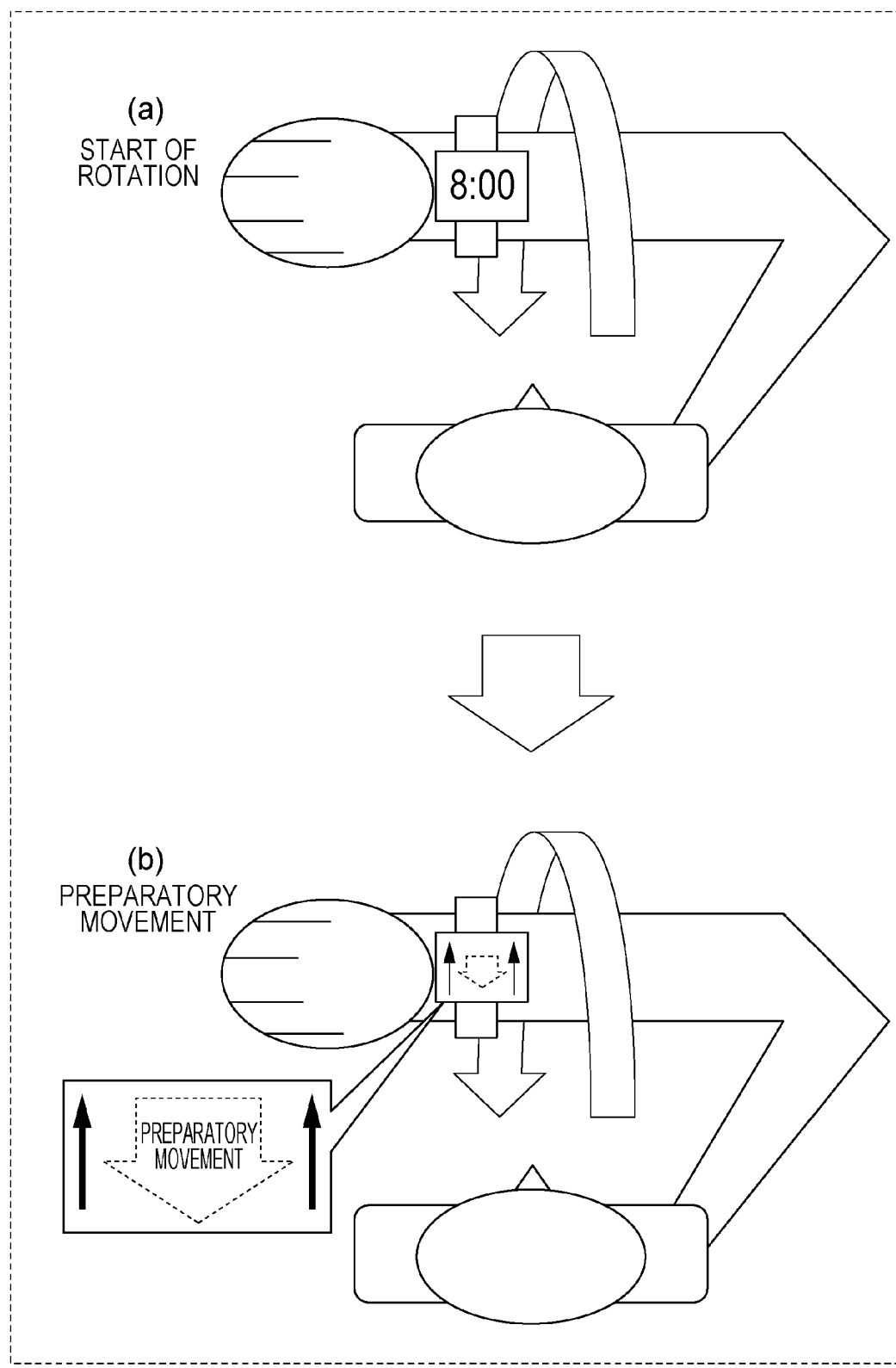
FIG. 31 illustrates an example of displayed information indicating a preparatory movement according to the fifth exemplary embodiment.

FIG. 31 illustrates an example of displayed information indicating the preparatory movement according to the fifth exemplary embodiment. In FIG. 31(*a*), the user starts the first rotational movement (the outward rotation of the wrist in this example). At that time, the first rotational movement satisfies the predetermined condition. As a result, as illustrated in FIG. 31(b), the information indicating the preparatory movement is displayed on the display screen during the first rotational movement. In FIG. 31(b), arrows indicating the first rotational direction and the second rotational direction are displayed together with the character string "preparatory movement".

Effects

As described above, according to the present exemplary embodiment, the input apparatus 500 can determine whether the first control command corresponding to the first rotational direction is output on the basis of the result of determination as to whether the first rotational movement satisfies the predetermined condition. Accordingly, if the first rotational movement is highly likely to be the preparatory movement, output of the first control command can be prevented. As a result, an erroneous operation caused by the preparatory movement can be more reliably prevented.

In addition, according to the present exemplary embodiment, the input apparatus 500 can define the predetermined condition using at least one of the rotational speed and the rotation angle of the first rotational movement. More specifically, if at least one of the rotational speed and the rotation angle of the first rotational movement is small, output of the first control command can be prevented. The preparatory movement is performed to rotate the wrist in a direction in which it is difficult for the wrist to rotate and, thus, the magnitude of the preparatory movement is smaller than an intentional movement, in general. Accordingly, by using such a predetermined condition, it can be accurately determined whether the first rotational movement is the preparatory movement. As a result, an erroneous operation caused by the preparatory movement can be more reliably prevented.

In addition, according to the present exemplary embodiment, the input apparatus 500 can display the information indicating that the first control command is not output if the first rotational movement satisfies the predetermined condition. Accordingly, the user can be aware that the first control command caused by the first rotational movement is not output. For example, when the first rotational movement is performed as the preparatory movement and if the information indicating that the first control command is not output (e.g., the character string "preparatory movement") is displayed, the user can be aware that the gesture is correctly recognized. Furthermore, for example, when the user intentionally performs the first rotational movement and if the information indicating that the first control command is not output is displayed, the user can be aware that the gesture is incorrectly recognized. In such a case, by improving the operation of a gesture that causes wrong recognition of the gesture (e.g., increasing the rotational speed), the user can cause the information terminal to perform the intended proper operation.

Other Exemplary Embodiments

While the input apparatuses and the information terminals according to one or more exemplary embodiments have been described, the present disclosure is not limited to the exemplary embodiments. For example, the embodiments having a variety of modifications that those skilled in the art can conceive and embodiments formed by combining the elements of different embodiments may be encompassed in the scope of the one or more exemplary embodiments.

For example, while the above-described exemplary embodiments have been described with reference to the wrist data including at least one of the muscle potential and the acceleration, the wrist data is not limited thereto. For example, the measuring unit may measure the wrist data by periodically capturing the image of the wrist using a camera (an image sensor). In such a case, the start point time and a gesture are detected through image processing. Alternatively, the measuring unit may measure the wrist data using an angular velocity sensor fixed to the wrist of the user.

Note that the technique for detecting the rotational movement of the wrist in each of the above-described exemplary embodiments is only an example and, thus, the technique is not limited to the above-described technique. That is, the gesture detecting unit can employ any technique that can detect the rotational movement of the wrist. For example, the input apparatus need not include the measuring unit and the movement detecting unit.

While the above first exemplary embodiment has been described with reference to calculation of the absolute sum (TotalARV) of the muscle potentials included in the sequence of wrist data of multiple channels as the representative value, calculation of the representative value is not limited thereto. For example, the movement detecting unit may calculate TotalARV of a predetermined single channel as the representative value. Alternatively, for example, the movement detecting unit may calculate the TotalARV of any one of the multiple channels as the representative value.

Note that the representative value calculated by the movement detecting unit is not limited to TotalARV. For example, the representative value may be the average IEMG (AIEMG) in a frame. Alternatively, the representative value may be the sum of the RMSs of the multiple channels.

While the above first and second exemplary embodiments have been described with reference to the gesture detecting unit that calculates the RMS of the muscle potentials in a frame corresponding to the start point time for each of the channels, the RMS need not be calculated for each of the channels. For example, the gesture detecting unit may calculate the RMS of a predetermined single channel. Alternatively, the gesture detecting unit may calculate the RMS of any one of the plurality of channels.

While the above first and second exemplary embodiments have been described with reference to the movement detecting unit that detects the start point time using the muscle potential, detection of the start point time is not limited thereto. For example, the movement detecting unit may detect the start point time using the acceleration. More specifically, as in the case in which the muscle potential is used, the movement detecting unit may compare the representative value of the acceleration data for one frame (e.g., the average value or the highest value) with a predetermined threshold value and detect the start point time at which the movement of the wrist of the user starts.

Alternatively, the movement detecting unit may detect the start point time using both the muscle potential and the acceleration. More specifically, by performing a first comparison of the representative value of the muscle potentials and a threshold value and a second comparison of the representative value of the accelerations and a threshold value, the movement detecting unit may detect the start point time. For example, if the representative value exceeds the threshold value in both the first comparison and the second comparison, the movement detecting unit may detect the start point time. However, if the representative value does not exceed the threshold value in at least one of the first comparison and the second comparison, the movement detecting unit need not detect the start point time.

In addition, while the above first and second exemplary embodiments have been described with reference to detection of the start point time on the basis of the magnitude of the muscle potential, the start point time may be detected on the basis of the shape of the hand indicated by the muscle potential in addition to the magnitude of the muscle potential. That is, the movement detecting unit may detect, as the start point time, a point in time at which the wrist data corresponding to the representative value that is greater than the predetermined threshold value is measured and at which the muscle potential indicating that the shape of the user's hand is a predetermined shape is measured.

In this manner, the point in time at which the muscle potential indicating that the shape of the user's hand is a predetermined shape is measured can be detected as the start point time. Accordingly, the frequency of erroneous detection of a gesture when the user does not intend to make a gesture can be reduced. For example, by detecting the start point time when the shape of the hand is "paper", detection of a gesture every time the user rotates a door knob to open a door can be prevented. Note that detection of the shape of the hand has already been described with reference to FIGS. 13 and 14. Accordingly, description of detection of the shape of the hand is not repeated.

Note that in the above-described first and second exemplary embodiments, the range of the rotation angle about each of the axes corresponding to each of the wrist positions stored in the position determination condition storage unit 106 may be set for each of users. For example, after instructing a user to move the information terminal to each of the wrist positions as calibration, the range of the rotation angle about each of the axes can be set on the basis of the result obtained at that time. In addition, to reduce the burden imposed on the user at the time of calibration, when the user need to touch the display screen while viewing the screen (e.g., when the user starts a stopwatch function), the range of the rotation angle about each of the axes may be set on the basis of the acceleration value of the axis when the display screen is touched.

Note that when the posture of the information terminal is determined by using the acceleration of gravity and if the information terminal is accelerated or decelerated, the result of determination may have an error. Accordingly, after it is determined that the acceleration measured at the start point time is the acceleration of gravity, the process to determine the position of the information terminal may be performed.

While the above first and second exemplary embodiments have been described with reference to detection of the rotational movement of the wrist and the rotational direction from the output of a three-axis acceleration sensor, the output is not limited thereto. For example, the rotational movement of the wrist and the rotational direction may be detected by using the output of a three-axis gyro sensor. That is, the wrist data may be angular velocity data. For example, by analyzing a temporal change in the rotation angle illustrated in FIG. 17, the gesture detecting unit detects the rotational movement of the wrist and the rotational direction.

While the above first modification of the first exemplary embodiment has been described with reference to separate detection of the rotational movements of the wrist in two rotational directions when the rotational movement of the wrist in the difficult direction is detected, the rotational movements of the wrist in two rotational directions may be simultaneously detected. That is, as the gesture determination condition for detecting the rotational movement of the wrist in the difficult direction, an acceleration pattern corresponding to the rotational movements of the wrist in the two rotational directions may be stored in the gesture determination condition storage unit.

While the above second exemplary embodiment has been described with reference to determination as to whether the user is viewing the display screen using the image captured at the start point time, the image captured just at the start point time is not necessarily used. For example, it may be determined whether the user is viewing the display screen using the image captured at a slightly later point in time than the start point time. If the camera 320 starts capturing an image after the start point time is detected, only an image captured at a significantly later point in time than the start point time is acquired. Accordingly, the external image acquiring unit 201 may allow the camera 320 to continuously capture images for a period of time during which the external image acquiring unit 201 is waiting for input of a gesture. Alternately, the external image acquiring unit 201 may cause the camera 320 to start capturing an image when the wrist of the user enters a certain positional range and stop capturing an image when the wrist moves out of the positional range. More specifically, the position determination unit 105 may determine the position of the wrist of the user at predetermined time intervals regardless of the result of detection output from the movement detecting unit 104. Thereafter, the external image acquiring unit 201 may start and stop capturing an image on the basis of the result of determination.

While the above second exemplary embodiment has been described with reference to a technique for determining that the user is viewing the display screen if the face is detected in the image, determination as to whether the user is viewing the display screen may be made using another technique. For example, glasses or the pupil may be detected from the image, and it may be determined whether the user is viewing the display screen on the basis of the position or the shape of the detected glasses or pupil.

While the above second exemplary embodiment has been described with reference to a technique for determining whether the user is viewing the display screen using an image, the image need not always be used. For example, it may be determined whether the user is viewing the display screen on the basis of the posture of the information terminal. More specifically, if the normal direction of the display screen of the information terminal is within a predetermined angle range from the vertical direction (an upward direction), it may be determined that the user is viewing the display screen.

While the above fourth exemplary embodiment has been described with reference to the information terminal worn on the right wrist only on the back of the hand side for simplicity, the information terminal may be worn on the right wrist on the palm of the hand side or on the left wrist on the back of the hand side or the palm of the hand side. In such a case, the difficulty determination condition corresponding to the position at which the information terminal is worn is stored in the difficulty determination condition unit. Note that information about the position at which the information terminal is worn can be input via, for example, a user input.

Note that the above-described fourth exemplary embodiment may be combined with the above-described fifth exemplary embodiment. That is, both the determination as to whether the state of the wrist of the user is a state in which the second rotational movement is difficult and the determination as to whether the first rotational movement satisfies the preparatory movement condition may be made. In such a case, if the state of the wrist of the user is a state in which the second rotational movement is difficult and the first rotational movement satisfies the preparatory movement condition, output of the first control command is prevented. Accordingly, an erroneous operation caused by the preparatory movement can be more reliably prevented.

Note that in the above-described exemplary embodiments, each of the constituent elements may be formed from dedicated hardware or execution of a software program suitable for the constituent element. That is, each of the constituent elements may be formed by a program execution unit of a central processing unit (CPU) or a processor that reads the software program stored in a recording medium, such as a hard disk or a semiconductor memory. At that time, the software that forms, for example, the input apparatus of each of the exemplary embodiments is a program described below.

That is, the program causes a computer to perform a device control method for controlling a device to be controlled. The device control method includes a gesture detection step of detecting a rotational movement of the wrist of a user about the lower arm of the user and an output step of outputting, to the device to be controlled, a control command for controlling the device to be controlled on the basis of the rotational direction of the rotational movement detected in the gesture detection step. In the output step, if, in the gesture detection step, a first rotational movement in a first rotational direction is detected and thereafter a second rotational movement in a second rotational direction that is opposite to the first rotational direction is detected, a second control command corresponding to the second rotational direction is output without outputting the first control command corresponding to the first rotational direction in the output step.

Figure 32:
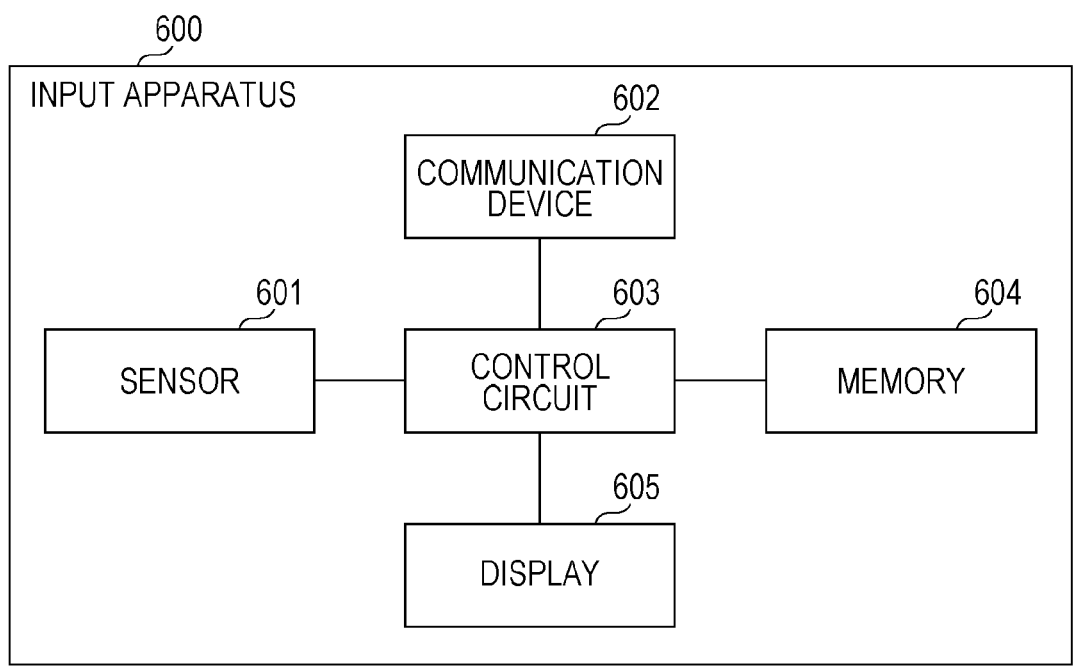
FIG. 32 illustrates an example of the hardware configuration of an input apparatus.

Note that the input apparatus may have a hardware configuration illustrated in FIG. 32. As illustrated in FIG. 32, an input apparatus 600 includes a sensor 601, a communication device 602, a control circuit 603, a memory 604, and a display 605.

The sensor 601 detects the rotational movement of the wrist about the lower arm of the user. The sensor 601 functions as the measuring unit, the movement detecting unit, and the gesture detecting unit of the above-described exemplary embodiments. The communication device 602 sends a control command to the device to be controlled. For example, the communication device 602 is a wireless communication adaptor.

The control circuit 603 outputs a control command for controlling the device to be controlled to the device to be controlled via the communication device 602 on the basis of the rotational direction of the rotational movement detected by the sensor 601. The control circuit 603 functions as the output unit of the above-described exemplary embodiments. In addition, the control circuit 603 controls the sensor 601, the communication device 602, the memory 604, and the display 605. The control circuit 603 may be a dedicated circuit or a general-purpose processor.

The memory 604 stores, for example, a program or data used by the control circuit 603.

The display 605 displays an image. The display 605 functions as the display unit 1003 according to the above-described fifth exemplary embodiment. For example, the display 605 is a liquid crystal display or an organic EL display. Alternatively, the display 605 may be a touch sensitive display.

The input apparatus according to an exemplary embodiment can be used as an input apparatus for controlling a device to be controlled by a gesture (e.g., an input apparatus incorporated into a wrist-wearable information terminal).

What is claimed is:

1. An input apparatus comprising:
 a non-transitory memory that stores a program; and
 a hardware processor that executes the program and causes the input apparatus to:
 detect a rotational movement of a wrist of a user about a lower arm of the user; and
 output a control command for controlling the device to be controlled to the device to be controlled on the basis of a rotational direction of the rotational movement detected,
 wherein when a first rotational movement in a first rotational direction is detected during a first predetermined time and a second rotational movement in a second rotational direction is detected, during a second predetermined time immediately after the first predetermined time, that is opposite to the first rotational direction, a second control command corresponding to the second rotational direction is outputted without outputting a first control command corresponding to the first rotational direction, and
 wherein when the first rotational movement is detected, it is determined whether a state of the wrist of the user is a state in which the second rotational movement is difficult when the first rotational movement starts, and
 when the second rotational movement that follows the first rotational movement is detected, the following operations are performed:
 (i) outputting the second control command without outputting the first control command when it is determined that the state of the wrist of the user is a state in which the second rotational movement is difficult, and
 (ii) outputting the first control command and a second control command when it is determined that the state of the wrist of the user is not a state in which the second rotational movement is difficult.

2. The input apparatus according to claim 1, wherein the hardware processor executes the program and causes the input apparatus to further:
 detect a posture of the input apparatus; and
 store a difficulty determination condition indicating the posture of the input apparatus corresponding to the state in which the second rotational movement is difficult,
 wherein it is determined whether the state of the wrist of the user is a state in which the second rotational movement is difficult by determining whether the posture of the input apparatus detected satisfies the difficulty determination condition.

3. The input apparatus according to claim 1, wherein the hardware processor executes the program and causes the input apparatus to:
 measure wrist data indicating a movement of the wrist of the user over time using a sensor mounted on the wrist of the user; and
 detect a start point time at which a movement of the wrist of the user is about to start using the wrist data measured,
 wherein the rotational movement is detected from the wrist data measured for a predetermined period of time from the start point time.

4. The input apparatus according to claim 3, wherein the hardware processor executes the program and causes the input apparatus to measure at least one of a muscle potential on the wrist of the user and an acceleration of the wrist of the user as the wrist data, and
wherein the start point time is detected by comparing at least one of a representative value of the muscle potential and a representative value of the acceleration measured with a predetermined threshold value.

5. The input apparatus according to claim 3, wherein the hardware processor executes the program and causes the input apparatus to:
determine whether the position of the wrist detected at the start point time is a predetermined position,
wherein when it is determined that the position of the wrist is the predetermined position, the rotational movement is detected.

6. The input apparatus according to claim 5, wherein the sensor includes an acceleration sensor having multiple axes,
wherein the wrist data includes an acceleration of the wrist of the user in each of directions of the multiple axes, and
the position of the wrist is determined on the basis of the accelerations of gravity in the directions of the multiple axes measured at the start point time.

7. The input apparatus according to claim 1, wherein the device to be controlled has a display screen,
wherein the hardware processor executes the program and causes the input apparatus to:
determine whether the user is viewing the display screen, and
output the control command on the basis of the rotational direction of the rotational movement and a result of the determination made.

8. The input apparatus according to claim 1, wherein when the device to be controlled has a display screen and is worn on the wrist of the user so that the display screen is located on the back of the hand side, the first rotational direction is a direction in which the wrist is rotated in an outward direction and the second rotational direction is a direction in which the wrist is rotated in an inward direction.

9. The input apparatus according to claim 1, wherein when the device to be controlled has a display screen and is worn on the wrist of the user so that the display screen is located on the palm of the hand side, the first rotational direction is a direction in which the wrist is rotated in an inward direction and the second rotational direction is a direction in which the wrist is rotated in an outward direction.

10. An input apparatus according comprising:
a non-transitory memory that stores a program; and
a hardware processor that executes the program and causes the input apparatus to:
detect a rotational movement of a wrist of a user about a lower arm of the user; and
output a control command for controlling the device to be controlled to the device to be controlled on the basis of a rotational direction of the rotational movement detected,
wherein when a first rotational movement in a first rotational direction is detected during a first predetermined time and a second rotational movement in a second rotational direction is detected, during a second predetermined time immediately after the first predetermined time, that is opposite to the first rotational direction, a second control command corresponding to the second rotational direction is outputted without outputting a first control command corresponding to the first rotational direction, and
wherein when the first rotational movement is detected, it is determined whether the first rotational movement satisfies a predetermined condition, and
when the second rotational movement that follows the first rotational movement is detected, the following operations are performed:
(i) outputting the second control command without outputting the first control command when it is determined that the first rotational movement satisfies the predetermined condition, and
(ii) outputting the first control command and the second control command when it is determined that the first rotational movement does not satisfy the predetermined condition.

11. The input apparatus according to claim 10, wherein the predetermined condition is that a rotational speed of the first rotational movement is lower than a threshold speed value.

12. The input apparatus according to claim 10, wherein the predetermined condition is that a rotation angle of the first rotational movement is less than a threshold angle value.

13. The input apparatus according to claim 10, wherein the predetermined condition is that a rotational speed of the first rotational movement is lower than a threshold speed value and a rotation angle of the first rotational movement is less than a threshold angle value.

14. The input apparatus according to claim 10, wherein the device to be controlled includes a display screen, and
wherein if it is determined that the first rotational movement satisfies the predetermined condition, a control command is outputted for displaying, on the display screen, information indicating that the first control command caused by the first rotational movement is not output.

15. An input apparatus for controlling a device to be controlled, comprising:
a non-transitory memory that stores a program; and
a hardware processor that executes the program and causes the input apparatus to:
detect a rotational movement of a wrist of a user about a lower arm of the user;
output a control command for controlling the device to be controlled to the device to be controlled on the basis of a rotational direction of the rotational movement detected;
measure wrist data indicating a movement of the wrist of the user over time using a sensor mounted on the wrist of the user; and
detect a start point time at which a movement of the wrist of the user is about to start using the wrist data measured,
wherein when a first rotational movement is detected in a first rotational direction and thereafter a second rotational movement is detected in a second rotational direction that is opposite to the first rotational direction, a second control command corresponding to the second rotational direction is outputted without outputting a first control command corresponding to the first rotational direction,
the rotational movement is detected from the wrist data measured for a predetermined period of time from the start point time,
at least one of a muscle potential on the wrist of the user and an acceleration of the wrist of the user is measured as the wrist data, the start point time is detected by comparing at least one of a representative value of the muscle potential and a representative value of the acceleration measured with a predetermined threshold value, the wrist data includes the muscle potential on the wrist of the user, and a point in time at which the wrist data corresponding to the representative value that is greater than the predetermined threshold value is measured and at which the muscle potential indicating that a shape of a hand of the user is a predetermined shape is measured is detected as the start point time.

16. An input apparatus comprising:
a non-transitory memory that stores a program; and
a hardware processor that executes the program and causes the input apparatus to:
detect a rotational movement of a wrist of a user about a lower arm of the user;
output a control command for controlling the device to be controlled to the device to be controlled on the basis of a rotational direction of the rotational movement detected;
measure wrist data indicating a movement of the wrist of the user over time using a sensor mounted on the wrist of the user; and
detect a start point time at which a movement of the wrist of the user is about to start using the wrist data measured,
wherein when a first rotational movement in a first rotational direction is detected and thereafter a second rotational movement in a second rotational direction is detected that is opposite to the first rotational direction, a second control command corresponding to the second rotational direction is outputted without outputting a first control command corresponding to the first rotational direction,
the rotational movement from the wrist data measured by the measurer is detected for a predetermined period of time from the start point time,
the wrist data includes the muscle potential on the wrist of the user,
a shape of a hand of the user is detected from the wrist data measured at the start point time, and
when the shape of the hand is a predetermined shape, a control command corresponding to the rotational direction of the rotational movement is outputted, and
when the shape of the hand is not the predetermined shape, a control command corresponding to the rotational direction of the rotational movement is not outputted.

17. A device control method for controlling a device to be controlled, comprising:
detecting a rotational movement of a wrist of a user about a lower arm of the user; and
outputting, to the device to be controlled, a control command for controlling the device to be controlled on the basis of a rotational direction of the detected rotational movement,
wherein when, in detecting the rotational movement, a first rotational movement in a first rotational direction is detected during a first predetermined time and a second rotational movement in a second rotational direction, during a second predetermined time immediately after the first predetermined time, that is opposite to the first rotational direction is detected, a second control command corresponding to the second rotational direction is outputted without the first control command corresponding to the first rotational direction being outputted, and
wherein when the first rotational movement is detected, it is determined whether a state of the wrist of the user is a state in which the second rotational movement is difficult when the first rotational movement starts, and
when the second rotational movement that follows the first rotational movement is detected, the following operations are performed:
(i) outputting the second control command without outputting the first control command when it is determined that the state of the wrist of the user is a state in which the second rotational movement is difficult, and
(ii) outputting the first control command and a second control command when it is determined that the state of the wrist of the user is not a state in which the second rotational movement is difficult.

18. A non-transitory computer-readable recording medium storing a control program for causing an apparatus including a processor to perform a device control method for controlling a device to be controlled, the device control method comprising:
detecting a rotational movement of the wrist of a user about the lower arm of the user; and
outputting, to the device to be controlled, a control command for controlling the device to be controlled on the basis of the rotational direction of the detected rotational movement,
wherein when, in detecting the rotational movement, a first rotational movement in a first rotational direction is detected during a first predetermined time and a second rotational movement in a second rotational direction, during a second predetermined time immediately after the first predetermined time, that is opposite to the first rotational direction is detected, a second control command corresponding to the second rotational direction is outputted without the first control command corresponding to the first rotational direction being outputted, and
wherein when the first rotational movement is detected, it is determined whether a state of the wrist of the user is a state in which the second rotational movement is difficult when the first rotational movement starts, and
when the second rotational movement that follows the first rotational movement is detected, the following operations are performed:
(i) outputting the second control command without outputting the first control command when it is determined that the state of the wrist of the user is a state in which the second rotational movement is difficult, and
(ii) outputting the first control command and a second control command when it is determined that the state of the wrist of the user is not a state in which the second rotational movement is difficult.

* * * * *